(12) United States Patent
Emori

(10) Patent No.: US 10,317,009 B2
(45) Date of Patent: Jun. 11, 2019

(54) HIGH PRESSURE TANK, MANUFACTURING METHOD OF HIGH PRESSURE TANK, AND INSPECTION METHOD OF SEALING CHARACTERISTIC

(71) Applicant: TOYOTA JIDOSHA KABUSHIKI KAISHA, Toyota-shi, Aichi-ken (JP)

(72) Inventor: Sakuma Emori, Seto (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 210 days.

(21) Appl. No.: 15/223,504

(22) Filed: Jul. 29, 2016

(65) Prior Publication Data

US 2017/0038006 A1 Feb. 9, 2017

(30) Foreign Application Priority Data

Aug. 6, 2015 (JP) ................................ 2015-155668
Feb. 18, 2016 (JP) ................................ 2016-028545

(51) Int. Cl.
*F16C 1/02* (2006.01)
*G01M 3/22* (2006.01)
(Continued)

(52) U.S. Cl.
CPC .................. *F17C 1/02* (2013.01); *F17C 1/14* (2013.01); *F17C 1/16* (2013.01); *G01M 3/226* (2013.01);
(Continued)

(58) Field of Classification Search
CPC .. G01M 3/226; F17C 1/02; F17C 1/14; F17C 1/16; F17C 2201/0104; F17C 2205/0305; F17C 2209/2109; F17C 2270/01; F17C 2203/0639; F17C 2203/0663; F17C 2209/2118; F17C 2209/227; F17C 2209/23; F17C 2221/012; F17C 2223/0123; F17C 2223/036
See application file for complete search history.

(56) References Cited

U.S. PATENT DOCUMENTS 5,476,189 A * 12/1995 Duvall ...................... F17C 1/16
220/588
6,227,402 B1 5/2001 Shimojima et al.
(Continued)

FOREIGN PATENT DOCUMENTS

JP 2000-291887 10/2000
JP 2000-291888 10/2000
(Continued)

*Primary Examiner* — Daniel S Larkin
(74) *Attorney, Agent, or Firm* — Finnegan, Henderson, Farabow, Garrett & Dunner, LLP

(57) ABSTRACT

An opening-side flange may include a connecting surface including an inclined surface, a corner part, and an annular groove on a bottom-face side. A conical surface part of the inclined surface may be a conical surface of a truncated cone, and may be inclined such that a radially outer end thereof approaches an opening side. The corner part may be a corner formed between the inclined surface and the annular groove, and may function as a sealing surface with the liner. The annular groove may be a part that connects the inclined surface to an outer surface part, and may be a part that is hollowed toward the opening side relative to the inclined surface.

14 Claims, 21 Drawing Sheets

(51) Int. Cl.
*F17C 1/02* (2006.01)
*F17C 1/14* (2006.01)
*F17C 1/16* (2006.01)

(52) U.S. Cl.
CPC .............. *F17C 2201/0104* (2013.01); *F17C 2203/0639* (2013.01); *F17C 2203/0646* (2013.01); *F17C 2203/0663* (2013.01); *F17C 2205/0305* (2013.01); *F17C 2209/2109* (2013.01); *F17C 2209/2118* (2013.01); *F17C 2209/227* (2013.01); *F17C 2209/23* (2013.01); *F17C 2221/012* (2013.01); *F17C 2223/0123* (2013.01); *F17C 2223/036* (2013.01); *F17C 2270/01* (2013.01); *Y02E 60/321* (2013.01); *Y02P 70/56* (2015.11)

(56) References Cited

U.S. PATENT DOCUMENTS

| | | | |
|---|---|---|---|
| 8,668,108 B2 * | 3/2014 | Yeggy | ............... F17C 13/002 220/581 |
| 2006/0102866 A1 | 5/2006 | Yamagishi | |
| 2008/0251520 A1 | 10/2008 | Ota et al. | |
| 2012/0037641 A1 | 2/2012 | Bruce et al. | |
| 2015/0345702 A1 | 12/2015 | Newhouse et al. | |

FOREIGN PATENT DOCUMENTS

| | | |
|---|---|---|
| JP | 2004-211783 | 7/2004 |
| JP | 2008-256151 | 10/2008 |
| JP | 2012-514727 | 6/2012 |
| JP | 2012-518146 | 8/2012 |
| WO | WO 2010/080948 A1 | 7/2010 |

\* cited by examiner

COMPARATIVE EXAMPLE

HIGH PRESSURE TANK, MANUFACTURING METHOD OF HIGH PRESSURE TANK, AND INSPECTION METHOD OF SEALING CHARACTERISTIC

This application claims the benefit of Japanese Patent Application No. 2015-155668, filed on Aug. 6, 2015, and Japanese Patent Application No. 2016-028545, filed on Feb. 18, 2016, each of which is incorporated herein by reference in its entirety.

BACKGROUND

Technical Field

The present disclosure relates to a high pressure tank, a manufacturing method of a high pressure tank, and an inspection method of a sealing characteristic of a test piece.

Description of Related Art

10003) A mouth piece (a boss) for a high pressure tank, described in Published Japanese Translation of PCT application No. 2012-514727 (JP-A-2012-514727), may include a keyway on an inner side thereof, and may further includes a ring lip extending outwardly in a radial direction from the keyway. An inner surface of the ring lip may have an inclined surface. The inclined surface may be inclined toward an end side as it goes from an inner end to an outer end in the radial direction.

The high pressure tank can be formed without considering the following facts: gas stored in the high pressure tank accumulates on an interface between a liner and the mouth piece through a microgap therebetween; and when the gas passes through the liner itself and accumulates on the interface, or particularly when a sealing characteristic between the liner and the mouth piece decreases at a low pressure, the gas may accumulate on the interface between the mouth piece and the liner.

FIGS. 17 and 18 are views to describe the gas accumulating on the interface between the liner and the mouth piece. Note that a configuration illustrated in FIGS. 17 and 18 is not well known. FIG. 18 is an enlarged view of a region 16 illustrated in FIG. 17.

A high pressure tank 1000 includes a liner 1020 and a mouth piece 1100, and stores high-pressure gas therein. The gas thus stored may enter an interface between the liner 1020 and the mouth piece 1100 from a boundary K between the liner 1020 and the mouth piece 1100. In a case of FIG. 18, when the gas is discharged suddenly and a tank internal pressure is rapidly decreased from a high pressure to a low pressure, a pressure of the gas accumulating in the interface may become larger than the tank internal pressure due to a time lag before the gas that enters the interface returns to the tank internal space, so that a force toward the internal space is applied to the liner 1020 so as to separate the liner 1020 from the mouth piece 1100, as illustrated in FIG. 18.

Particularly, when a pressure of the gas stored in the high pressure tank 1000 is small, a contact pressure on the interface due to an internal pressure may also become small. That is, a force that causes the liner 1020 to be pressed against the mouth piece 1100 due to the gas pressure may become weak. In this case, it can be difficult to secure a sealing characteristic, thereby causing such a problem that the gas easily enters the interface.

SUMMARY

The present disclosure provides a technique to restrain separation between a liner and a mouth piece and to increase a sealing characteristic.

A first aspect of the present disclosure relates to a high pressure tank including a liner having an internal space in which to seal a fluid and a mouth piece attached to the liner. The high pressure tank may be configured as follows: the mouth piece includes a cylindrical portion having an opening, and a flange connected to the cylindrical portion and projecting in a radial direction of the cylindrical portion; an outer peripheral surface of the flange includes a top face and a bottom face with a radially outer end of the outer peripheral surface being taken as a boundary between the top face and the bottom face; the bottom face includes an inner surface part at least partially exposed to the internal space, an annular groove hollowed toward an opening side, a connecting surface connecting the inner surface part to the annular groove and an inclined surface, and a corner part placed between the inclined surface and the annular groove; the inclined surface is inclined toward the opening side from a radially inner end of the inclined surface to a radially outer end of the inclined surface; the annular groove includes an outer surface placed on a radially outer side relative to a most hollow part of the annular groove in an axis direction of the cylindrical portion; and a contact pressure between the corner part and the liner is higher than a contact pressure between the outer surface and the liner. According to the first aspect, even in a low-pressure state where low pressure is generated in the internal space, a high contact pressure may be generated on an interface between the liner and the corner part of the mouth piece. Accordingly, it is possible to secure a sealing characteristic even in the low-pressure state. In addition, since it is possible to secure the sealing characteristic at the corner part placed on the radially inner side relative to the annular groove as described above, it is possible to restrain the fluid stored in the internal space from entering the annular groove.

In the first aspect, a maximum height of the corner part may be 6.3 μm or less. According to the aspect, the sealing characteristic at the corner part may improve.

In the first aspect, the liner may be bonded to at least part of the inclined surface. The aspect may make it difficult for the liner to be separated from the inclined surface. Note that "bonding" in the present application is a concept including "adhesion." The adhesion as used herein is a concept including "mechanical adhesion."

In the first aspect, the high pressure tank may further include a sealing member configured to seal a radially inner end of the liner. The aspect may make it difficult for the fluid to enter from the boundary between the radially inner end of the liner and the mouth piece.

In the first aspect, the radially inner end of the liner may be placed on a radially outer side relative to a position distanced by a predetermined distance toward a radially inner side from a connecting position between the inner surface part and the inclined surface so that the contact pressure at the corner part is maintained. According to the aspect, a space where the fluid enters between the liner and the mouth piece may become small between the inner end and the corner part. This can make it easy to secure the contact pressure to be applied to the corner part, so that the sealing characteristic at the corner part can be secured.

In the first aspect, the radially inner end of the liner may be placed on the inclined surface. According to the aspect, the radially inner end of the liner can be surely placed on the radially outer side relative to the predetermined position. Further, even if the fluid enters from the boundary between the liner and the mouth piece, since the liner is inclined toward the internal space, the accumulated fluid can be further easily discharged to the internal space. On this account, a force that acts to separate the liner due to the accumulated fluid may decrease, thereby making it possible to secure the sealing characteristic.

In the first aspect, the bottom face may include a hooking groove hollowed toward the opening side on the radially inner side relative to the annular groove, the hooking groove may include a hooking corner part on its radially outer surface, the hooking corner part being projecting toward the radially inner side, and the liner may make contact with the hooking corner part. According to the aspect, even if a force to pull off the liner from the mouth piece acts in a manufacturing process, a resistance to the force can be generated in at least either of the corner part of the annular groove and the hooking corner part, so that poor manufacture may be reduced. The reason why the resistance is generated is because the corner part of the annular groove and the hooking corner part project toward different directions along the radial direction. Since the corner part is formed between the inclined surface and the annular groove, the corner part may project radially outwardly.

In the first aspect, an angle of the corner part on a cut surface including the axis may be 90 degrees or less. According to the aspect, the sealing characteristic at the corner part may further improve.

In the first aspect, the annular groove may be filled with the liner. According to the aspect, it is possible to avoid such a situation that the fluid is accumulated in the annular groove.

In the first aspect, a gap may exist between the liner and the annular groove. According to the aspect, it may be possible to determine whether shrinkage occurs or not based on whether the gap exists or not.

In the first aspect, a part of the liner may be recessed toward the opening side on a plane exposed to the internal space, the part corresponding to the annular groove in the axis direction. According to the aspect, it may be possible to determine whether the formed gap is buried or not.

A second aspect of the present disclosure relates to a method for manufacturing the high pressure tank of the first aspect. The manufacturing method may include: attaching the liner made of resin to the mouth piece; and filling a gap formed between the liner and the annular groove when the liner is attached to the mouth piece, in such a manner that a temperature and a pressure of the fluid making contact with an inner peripheral surface of the liner are maintained to respective predetermined values or more so that the liner flows to fill the gap. According to the second aspect, filling of the annular groove with the liner may be achievable by use of creep deformation of the resin.

In the second aspect, the manufacturing method may further include: forming a reinforcing layer covering the liner before the temperature and the pressure of the fluid making contact with the inner peripheral surface of the liner are maintained to the respective predetermined values or more. According to the aspect, while the reinforcing layer as a part of the high pressure tank is formed, the deformation of the liner due to pressure application can be restrained.

A third aspect of the present disclosure relates to a method for manufacturing the high pressure tank of the first aspect. The manufacturing method may include attaching the liner to the mouth piece by insert molding, wherein when the liner is attached to the mouth piece, a radially outer side of the liner relative to the corner part is cooled off earlier than a radially inner side of the liner relative to the corner part, so that the liner is pressed against the corner part. According to the third aspect, a high contact pressure at the corner part can be achieved by the insert molding.

A fourth aspect of the present disclosure relates to an inspection method of a sealing characteristic on a contact face of a test piece between a resin member and a metallic member. The inspection method may include preparing the metallic member, the metallic member including, as at least part of the contact surface, an annular groove hollowed toward an inner side of the metallic member, a connecting surface including an inclined surface connected to the annular groove on an inner side in a radial direction of the annular groove, and a corner part placed between the inclined surface and the annular groove, the metallic member further including an inner surface part connected to the connecting surface on a radially inner side relative to the connecting surface, the inclined surface inclined from the radially inner side toward a radially outer side so as to approach a virtual plane that makes contact with the annular groove; preparing the resin member configured such that a radially inner end of the resin member is placed on the connecting surface; and performing an inspection such that a pressure is applied to a fluid existing in a boundary between the radially inner end of the resin member and the metallic member, so as to measure an amount of a fluid that enters from the boundary and passes through the connecting surface and the corner part. According to the fourth aspect, it is possible to inspect the sealing characteristic of the high pressure tank of the first aspect by use of the test piece.

In the fourth aspect, an angle of the corner part on a cut surface including an axis may be 90 degrees or less, and the axis may pass through a center of a circle as a tangent between the annular groove and the virtual plane and be perpendicular to the virtual plane. According to the aspect, the inspection can be performed in a case where the angle of the corner part is 90 degrees or less.

In the fourth aspect, the metallic member may have a hole that exposes the resin member, on the radially outer side relative to the corner part, a diameter of the hole may be set such that the resin member does not enter the hole when the pressure is applied to the fluid existing in the boundary, and the measurement may be performed on a fluid flowing out from the hole. According to the aspect, most of the fluid that has passed through the connecting surface and the corner part may pass through the hole, so the measurement can be easily performable.

In the fourth aspect, the test piece may be sandwiched between two separate members, and the two separate members may be fastened by a plurality of bolts placed on concentric circles such that axial forces of the bolts act in a direction perpendicular to the radial direction. According to the aspect, the inspection can be performable in a state similar to the high pressure tank.

The embodiments of the present disclosure may be achievable in various forms other than the above aspects. For example, embodiments of the present disclosure may be achievable simply as a mouth piece.

BRIEF DESCRIPTION OF THE DRAWINGS

Exemplary embodiments will be described below with reference to the accompanying drawings, in which like numerals denote like elements, and wherein.

DETAILED DESCRIPTION OF EMBODIMENTS

Figure 1:
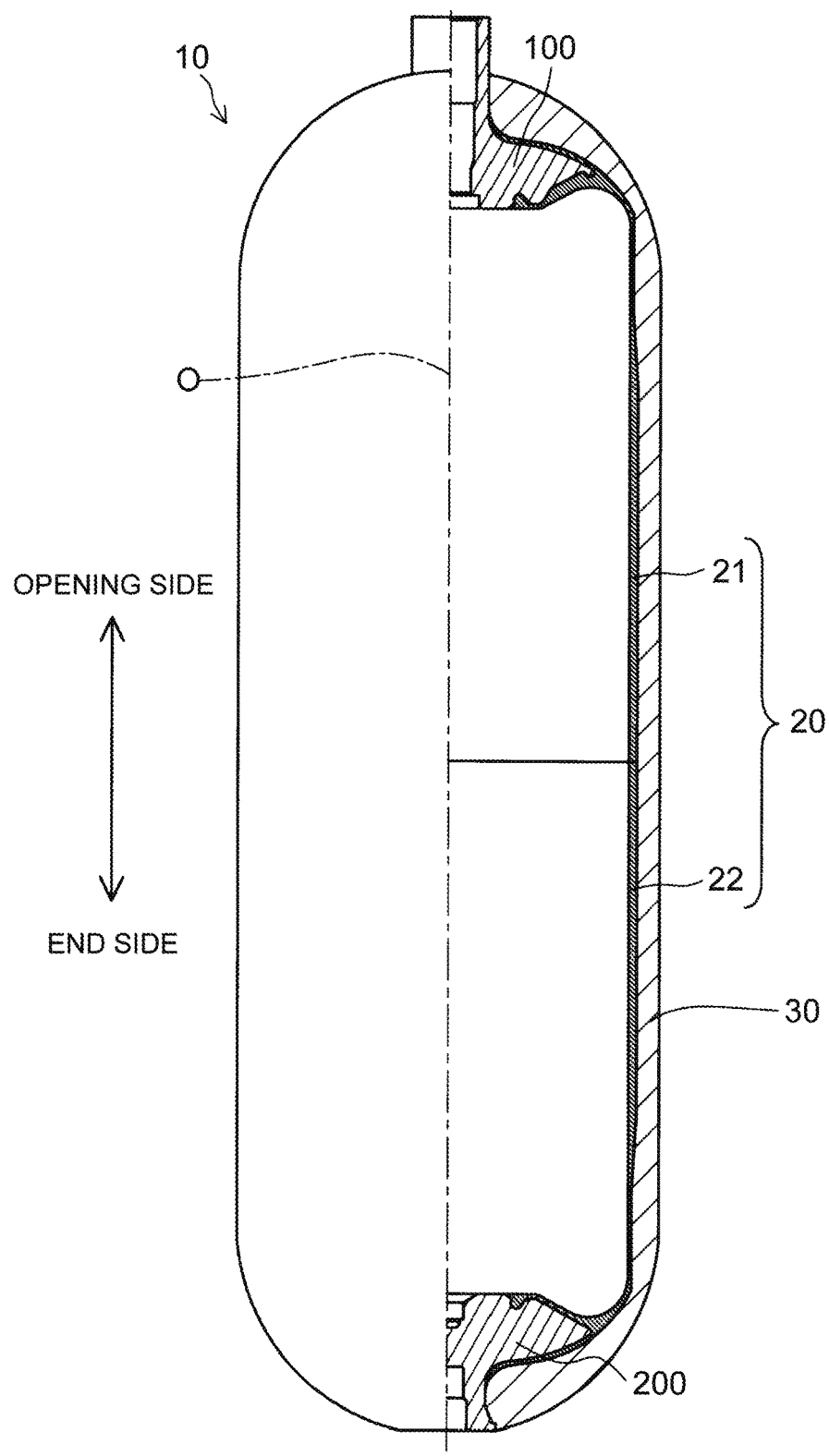
FIG. 1 is a a partial exterior view and a partial sectional view of a high pressure tank.

Embodiments of the present disclosure are described below. FIG. 1 illustrates a high pressure tank 10. FIG. 1 illustrates an appearance on a left side relative to an axis O and a section on a right side relative to the axis O. Sections to be described in the present embodiment are sections including the axis O.

The high pressure tank 10 stores compressed hydrogen therein, and is provided in a fuel-cell vehicle. The high pressure tank 10 includes a liner 20, a reinforcing layer 30, a mouth piece 100, and a boss 200. Each of the liner 20, the reinforcing layer 30, the mouth piece 100, and the boss 200 is formed generally in a rotation symmetry around the axis O. Hereinafter, a direction perpendicular to the axis C is referred to as a radial direction.

The liner 20 is made of resin such as nylon (polyamide synthetic fiber), and forms an internal space in which to seal a fluid, together with the mouth piece 100 and the boss 200. Hereinafter, the space formed by the liner 20, the mouth piece 100, and the boss 200 so as to fill hydrogen therein is referred to as a "tank interior." Further, as illustrated in FIG. 1, in terms of a direction along the axis O, a mouth-piece side of the high pressure tank 10 is referred to as an opening side, and a boss side of the high pressure tank is referred to as an end side.

The liner 20 is formed by joining an opening-side divided liner 21 to an end-side divided liner 22. The reinforcing layer 30 covers an outer peripheral surface of the liner 20 so as to reinforce the liner 20.

The mouth piece 100 is made of metal such as aluminum, and is attached to an opening-side end so as to form an entrance for hydrogen. A valve (not shown) is attached to the mouth piece 100.

The boss 200 is attached to an end of the end side and is placed to be exposed to both inside and outside the high pressure tank 10. This arrangement is intended to dissipate heat in the tank interior to outside. In order to increase heat dissipation efficiency, metal with high thermal conductivity such as aluminum is employed as a material of the boss 200.

Figure 2:
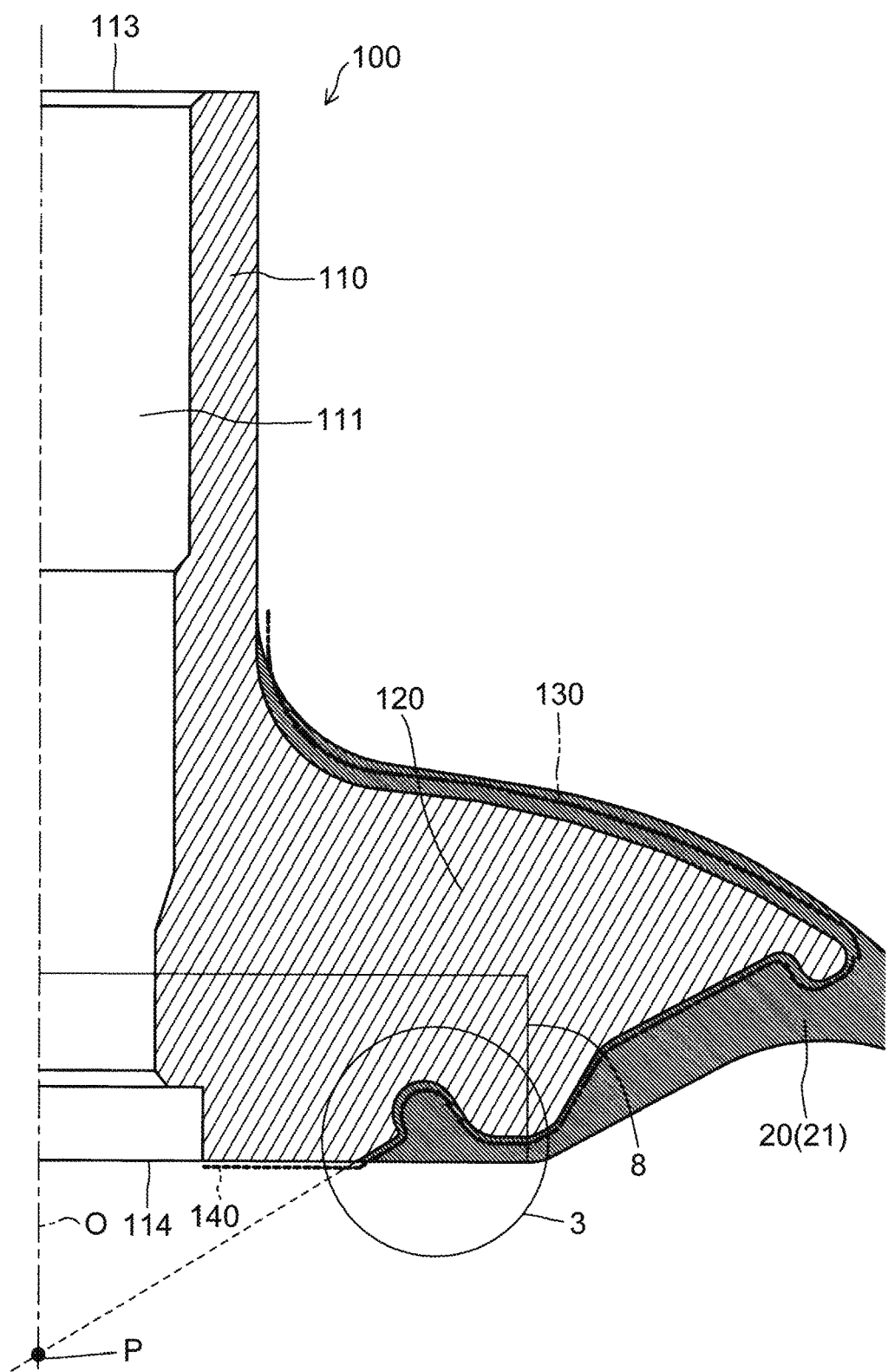
FIG. 2 is a sectional view around a mouth piece of the tank of FIG. 1.

FIG. 2 is a sectional view around the mouth piece 100. FIG. 2 illustrates a cut surface including the axis O of a cylindrical portion 110. In FIG. 2, the reinforcing layer 30 is not illustrated. The mouth piece 100 includes the cylindrical portion 110 and an opening-side flange 120. The cylindrical portion 110 has a through-hole 111. The through-hole 111 has an opening 113 and a connection opening 114, and functions as a channel that connects the outside of the high pressure tank 10 to the tank interior. The opening 113 is a part that is opened toward outside the high pressure tank 10. The connection opening 114 is a part that connects the through-hole 111 to the tank interior. An internal thread for attaching a valve is formed on an inner peripheral surface of the through-hole 111.

The opening-side flange 120 is a part that projects so as to protrude outwardly in the radial direction from the cylindrical portion 110. An outer surface of the opening-side flange 120 is divided into a top face 130 and a bottom face 140. A boundary between the top face 130 and the bottom face 140 is a radially outermost part of the opening-side flange 120. As illustrated in FIG. 2, a radially inner part (an inner surface part 141 in FIG. 3) of the bottom face 140 does not make contact with the liner 20, so as to be exposed in the tank interior.

Figure 3:
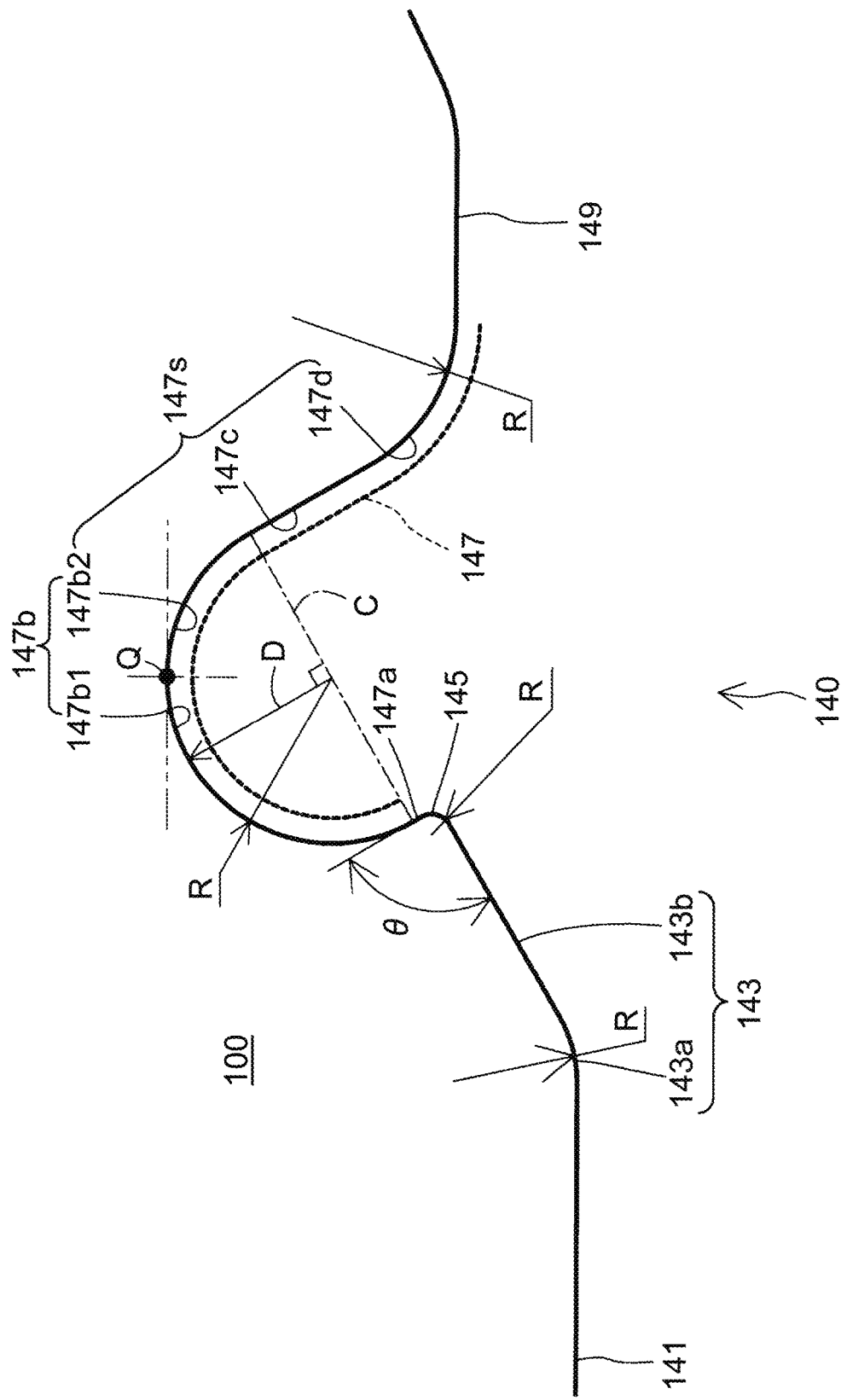
FIG. 3 is an enlarged view of a region 3 in FIG. 2.

FIG. 3 is an enlarged view of a region 3 in FIG. 2. In FIG. 3, the opening-side divided liner 21 is not illustrated. As illustrated in FIG. 3, the bottom face 140 includes the inner surface part 141, a connecting surface including an inclined surface 143, a corner part 145, an annular groove 147, and an outer surface part 149.

The inner surface part 141 is a plane perpendicular to the axis O, and is expressed as a segment in FIG. 3, which is a sectional view. Differently from the inner surface part 141, the inclined surface 143, the corner part 145, the annular groove 147, and the outer surface part 149 make contact with the opening-side divided liner 21.

The inclined surface 143 includes an inner-surface connecting part 143a and a conical surface part 143b. The inner-surface connecting part 143a is an R-shaped part that smoothly connects the inner surface part 141 to the conical surface part 143b, and is expressed as an arc in FIG. 3.

The conical surface part 143b is a part having a conical-surface shape included in a truncated cone, and is expressed as a segment in FIG. 3. A virtual vertex P (FIG. 2) of the truncated cone is placed on an end side relative to the inner surface part 141. That the virtual vertex P is placed on the end side relative to the inner surface part 141 can be understood from the fact that a radially outer end of the conical surface part 143b is closer to the opening 113 than a radially inner end of the conical surface part 143b in FIG. 3. Further, if this fact is expressed including the inner-surface connecting part 143a, a radially outer end of the inclined surface 143 is closer to the opening 113 than a radially inner end of the inclined surface 143. Such an inclination can be also expressed such that the inclined surface 143 is inclined toward an opening-113 side as it goes from the radially inner end to the radially outer end. Hereinafter, this inclination is expressed "to be inclined toward the opening-113 side" in an abbreviated manner.

The corner part 145 is a part as a corner formed between the inclined surface 143 and the annular groove 147, and is formed to turn inward from a radially outer side of the opening-side flange 120. A sectional shape of the corner part 145 is an R-shape. A size of the R-shape of the corner part 145 is 0.5 mm. A surface roughness of the corner part 145 is 6.3 μm or less in terms of a maximum height (Rz). The maximum height (Rz) is defined as the sum of the largest profile peak height and the largest profile valley depth within a sampling length.

The annular groove 147 is a part that connects the inclined surface 143 to the outer surface part 149, and is a recess that is hollowed toward a topface 130 side. The outer surface part 149 is a part placed on a radially outer side relative to the annular groove 147, and a radially outer end thereof makes contact with the top face 130. The annular groove 147 includes a corner connecting part 147a, a semicircular arc part 147b, an inner conical surface part 147c, and an outer-surface connecting part 147d.

The corner connecting part 147a is a part of a conical surface that connects the corner part 145 to the semicircular arc part 147b. Here, an angle θ of the corner part 145 in the section is defined. The angle θ of the corner part 145 in the present embodiment is an inferior angle (<180 degrees) formed between the inclined surface 143 and the corner connecting part 147a. The angle θ is 90 degrees in the present embodiment. The angle θ is set to 90 degrees based on a result of numerical calculation. The numerical calculation will be described later.

As illustrated in FIG. 3, the semicircular arc part 147b includes a first surface 147b1 and a second surface 147b2. A boundary between the first surface 147b1 and the second surface 147b2 is a virtual circle, and the circle makes contact with the semicircular arc part 147b on a side thereof closest to the opening. A virtual point thereof is expressed as a point Q in FIG. 3.

The semicircular arc part 147b is a part having a semicircular-arc sectional shape as illustrated in FIG. 3. As illustrated in FIG. 3, a direction which is along a perpendicular bisector of a chord C of the semicircular arc part 147b and which is directed from the chord C to the semicircular arc part 147b is defined as a recess direction D. In the present embodiment, as illustrated in FIG. 3, the recess direction D has a radially inner component.

The inner conical surface part 147c is a part connected to a radially outer side of the semicircular arc part 147b, and is a part of an inner peripheral surface of the truncated cone. A segment illustrated as a sectional shape of the inner conical surface part 147c is parallel to the corner connecting part 147a. The outer-surface connecting part 147d is an R-shaped part that connects the inner conical surface part 147c to the outer surface part 149.

A contact pressure between the corner part 145 and the liner 20 is larger than a contact pressure between the outer surface 147s and the liner 20. As illustrated in FIG. 3, the outer surface 147s is a part including the second surface 147b2, the inner conical surface part 147c, and the outer-surface connecting part 147d. That is, in the annular groove 147, the outer surface 147s is a part placed on the radially outer side relative to a deepest (i.e., a most hollow) part (a circle including the point Q) in an axis-O direction.

With regard to a part where the outer surface 147s is separated from the liner 20, the "contact pressure between the outer surface 147s and the liner 20" is defined as zero. The reason why a large contact pressure is generated at the corner part 145 will be described later with reference to FIG. 7 and so on.

Figure 4:
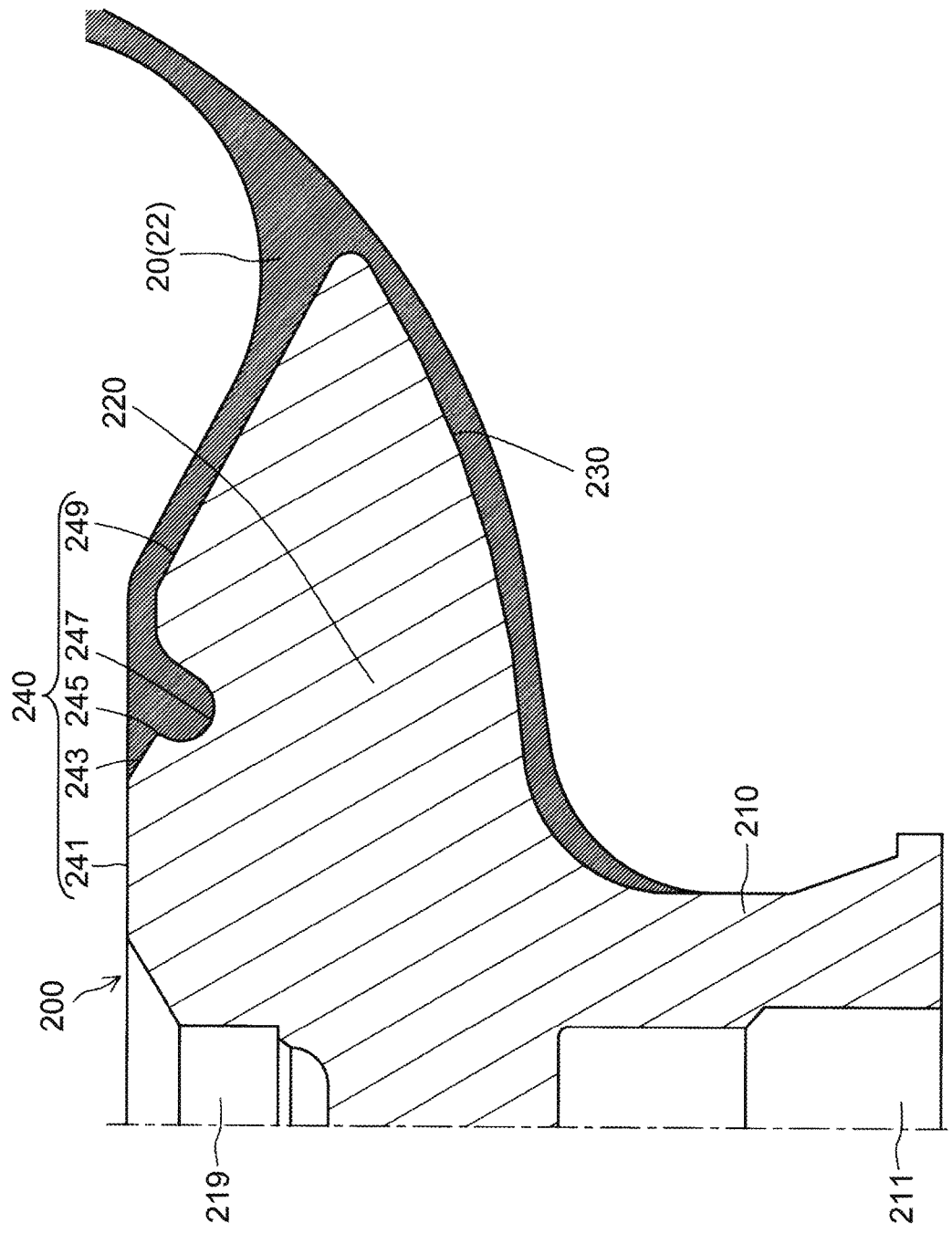
FIG. 4 is a sectional view around a boss of the tank of FIG. 1.

FIG. 4 is a sectional view around the boss 200. In FIG. 4, the reinforcing layer 30 is not illustrated. The boss 200 includes an end-side cylindrical portion 210 and an end-side flange 220.

The end-side cylindrical portion 210 is provided with an outer hole 211 and an inner hole 219. The outer hole 211 and the inner hole 219 are used at the time when a FW (Filament Winding) method is performed (S360 of FIG. 5 to be described later).

Similarly to the opening-side flange 120, the end-side flange 220 is a part that projects so as to protrude outwardly in the radial direction from the end-side cylindrical portion 210. An outer surface of the end-side flange 220 is divided into a bottom face 230 and an upper face 240.

The upper face 240 includes an inner surface part 241, a connecting surface including an inclined surface 243, a corner part 245, an annular groove 247, and an outer surface part 249. They have almost the same shapes as those in the bottom face 140 except for the outer surface part 249, so detailed descriptions thereof will be omitted.

Further, since the upper face 240 of the boss 200 has almost the same shape as the bottom face 140 of the mouth piece 100, operations and effects obtained by the shape of the bottom face 140 apply to the upper face 240. The following describes only the bottom face 140 in terms of common operations and effects between the bottom face 140 and the upper face 240.

Figure 5:
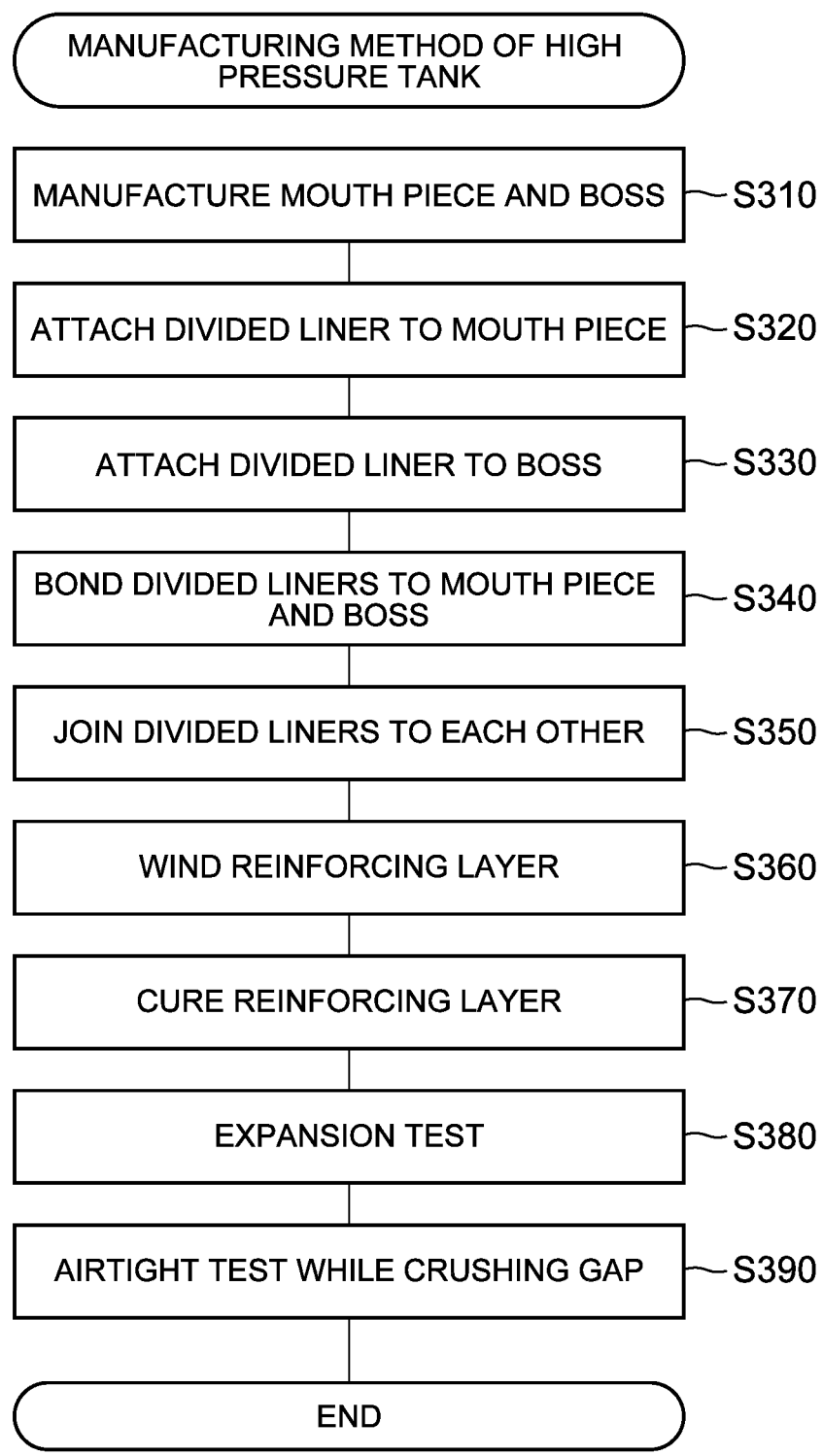
FIG. 5 is a flowchart illustrating an outline of a manufacturing method of the high pressure tank.

FIG. 5 is a flowchart illustrating an outline of a manufacturing method of the high pressure tank 10. First, the mouth piece 100 and the boss 200 are manufactured by forging and cutting (S310). Then, the opening-side divided liner 21 is attached to the mouth piece 100 (S320). In the present embodiment, insert molding is used for the attachment in S320.

Figure 6:
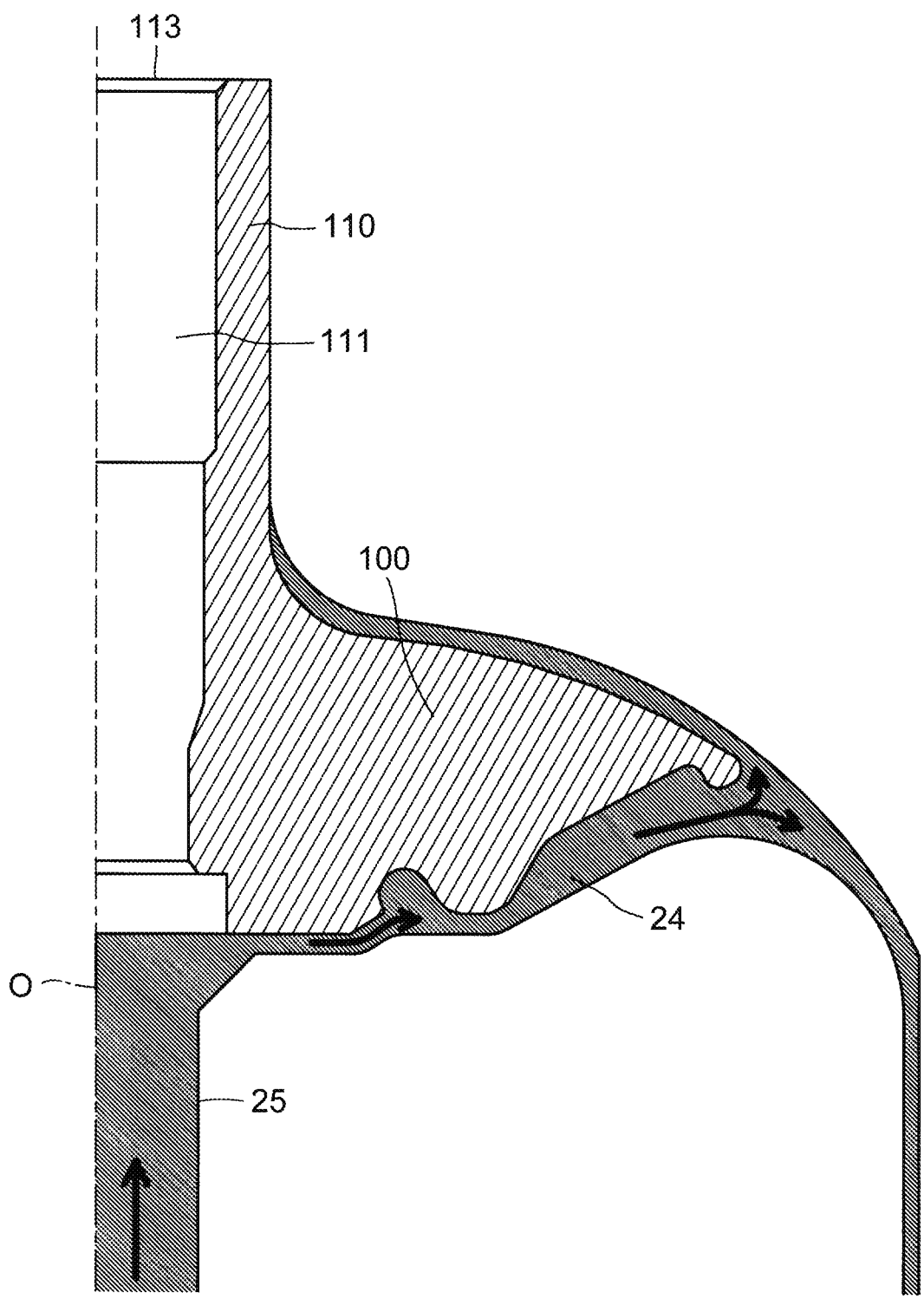
FIG. 6 is a sectional view illustrating a flow of a resin material in insert molding.

FIG. 6 is a sectional view illustrating a flow of a resin material 24 in the insert molding. The resin material 24 is melted in the insert molding, and by cooling off the resin material 24, the opening-side divided liner 21 is formed. The resin material 24 is poured from a gate 25 so as to flow along the mouth piece 100 and a mold (not shown). Conventionally, a plurality of through-holes is formed on a radially outer side of a mouth piece, so that resin is injected therefrom to form a liner. Thus, differently from the related art, the gate 25 in the present embodiment is placed in a central part in the radial direction as illustrated in FIG. 6. Because of this, differently from the related art, the resin material flows from the radially inner side toward the outer side.

In S320, a temperature of the resin material 24 is kept at a predetermined temperature in the gate 25. The predetermined temperature is a temperature at which the resin material melts, and is higher than an atmospheric temperature. On this account, as the resin material 24 is distanced from the gate 25, the resin material 24 is cooled off by the mouth piece 100 and the mold, and thus, curing thereof progresses. After the resin material 24 is filled sufficiently and a part to become the opening-side divided liner 21 is cured, the resin inside the gate 25 is cooled off. After that, the mold is taken off and a part of the resin material 24 thus cured is removed, and hereby, S320 is completed. The part to be removed in the present embodiment is a part on an end side relative to the inner surface part 141. That is, the resin material 24 thus cured is cut along the same plane as the inner surface part 141.

Figure 7:
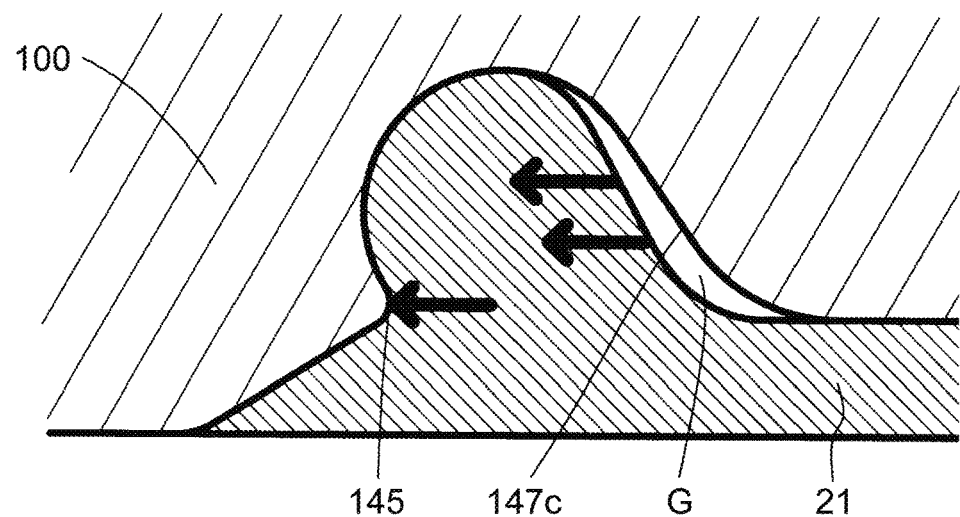
FIG. 7 is a sectional view illustrating a state where an opening-side divided liner shrinks.

FIG. 7 is a sectional view illustrating a state where the opening-side divided liner 21 shrinks after S320. When the opening-side divided liner 21 is cured in the insert molding as described above, the opening-side divided liner 21 shrinks more largely than the metal mouth piece 100. This shrinkage mainly generates a force in a direction from the radially outer side toward the radially inner side. The reason why the force is generated in this direction is because the cooling and curing is started from a distanced part of the resin material 24 from the gate 25, that is, a part thereof on the radially outer side as described above. Since the part that is cured first receives a pulling force from a part that is cured later, when the curing is performed from the part on the radially outer side, the resin material 24 shrinks toward the radially inner side. In contrast, in a case of the related art, since the resin material flows in a reverse direction to the present embodiment as described above, the cooling is performed from a part on the radially inner side, so that the resin material shrinks toward the radially outer side.

As a result, as illustrated in FIG. 7, in the annular groove 147 (mainly, the inner conical surface part 147c), the opening-side divided liner 21 is separated from the mouth piece 100, so that a gap G is formed. By daringly generating such a separation, it is possible to decrease a stress to be generated in the resin material 24 due to the shrinkage, and eventually, to reduce poor manufacture.

Further, when the opening-side divided liner 21 shrinks toward the radially inner side, the contact pressure between the corner part 145 and the opening-side divided liner 21 increases, while the contact pressure between the outer surface 147s (mainly, the inner conical surface part 147c) and the opening-side divided liner 21 decreases. That is, the opening-side divided liner 21 cuts into the corner part 145. In other words, the opening-side divided liner 21 is pressed against the corner part 145. Hereby, a sealing characteristic of the corner part 145 improves. Besides, the corner part 145 is placed on the radially inner side relative to the annular groove 147, that is, in a boundary between the sectional liner 20 and the mouth piece 100 in the section illustrated in FIG. 3, the corner part 145 is placed on a side closer to the inner surface part 141 than the outer surface 147s. Accordingly, gas entry to the annular groove 147 is inhibited by a high sealing characteristic of the corner part 145. In contrast, in a case of the related art in which the sealing is performed on the radially outer side relative to the annular groove, it is difficult to prevent the gas entry to the annular groove by the sealing.

Note that the occurrence of the pressing can be specified by examining a state inside the liner 20 by a nondestructive test using an X-ray CT, for example. Alternatively, the liner 20 may be actually cut to separately measure respective dimensions of the mouth piece 100 and the liner 20 by use of a shape measurement device such as "vectoron," so as to measure a gap. Based on a part where the gap is formed, a shrinkage direction of the resin material 24 in the insert molding can be estimated.

Subsequently, the end-side divided liner 22 is attached to the boss 200 (S330). A specific technique is the same as S320.

Subsequently, the opening-side divided liner 21 is bonded to the mouth piece 100, and the end-side divided liner 22 is bonded to the boss 200 (S340). In the present embodiment, thermo compression bonding is used for the bonding in S340. The thermo compression bonding is performed on part of a contact face therebetween. In the present embodiment, in a case of thermo compression bonding between the opening-side divided liner 21 and the mouth piece 100, the thermo compression bonding is performed on the inclined surface 143, and in a case of thermo compression bonding between the end-side divided liner 22 and the boss 200, the thermo compression bonding is performed on the inclined surface 243. In order to perform the thermo compression bonding successfully, etching is performed in advance on the inclined surface 143 and the inclined surface 243.

Subsequently, the opening-side divided liner 21 is joined to the end-side divided liner 22 (S350). In the present embodiment, laser welding is used for the joining in S350. The liner 20 is formed by the joining.

Then, the reinforcing layer 30 is wound by the FW method (S360). A material of the reinforcing layer 30 is CFRP (Carbon Fiber Reinforced Plastics) containing thermoset resin. In the present embodiment, epoxy resin is used as the thermoset resin.

As preparation of the FW method, a first rotating shaft (not shown) is inserted into the tank interior via the through-hole 111, so as to be inserted into the inner hole 219. Further, a second rotating shaft (not shown) is inserted into the outer hole 211. The rotation of a tank body in the FW method is implemented by the first and second rotating shafts.

Then, the reinforcing layer 30 is cured (S370). More specifically, the reinforcing layer 30 is heat-cured by heating the reinforcing layer 30.

Subsequently, an expansion test is performed (S380). More specifically, liquid is sealed in the tank interior, and a pressure is applied to the liquid. At this time, if the expansion of the reinforcing layer 30 is within a standard, the expansion test is passed. After the test is passed, subsequent step S390 is performed.

Finally, an airtight test is performed while the gap G is crushed (S390). The reason why the crushing of the gap G and the airtight test are performed together is because they can be implemented at once by sealing high-pressure gas.

First described is the airtight test. In order to perform the airtight test successfully, helium gas having a molecular weight smallest next to hydrogen gas is used as the gas to be sealed. A sealing pressure may be set to 70 MPa. The pressure is a value at the same level as a pressure of hydrogen to be stored in the high pressure tank 10. An amount of the gas that leaks outside is measured within a predetermined time (ten minutes in the present embodiment), and if the amount of the gas is within a standard, the airtight test is passed. Note that, even in a state where the gap G exists, the airtightness is secured by the sealing at the corner part 145 as described above. When the airtight test is passed, a manufacturing process of the high pressure tank 10 is finished.

Figure 8:
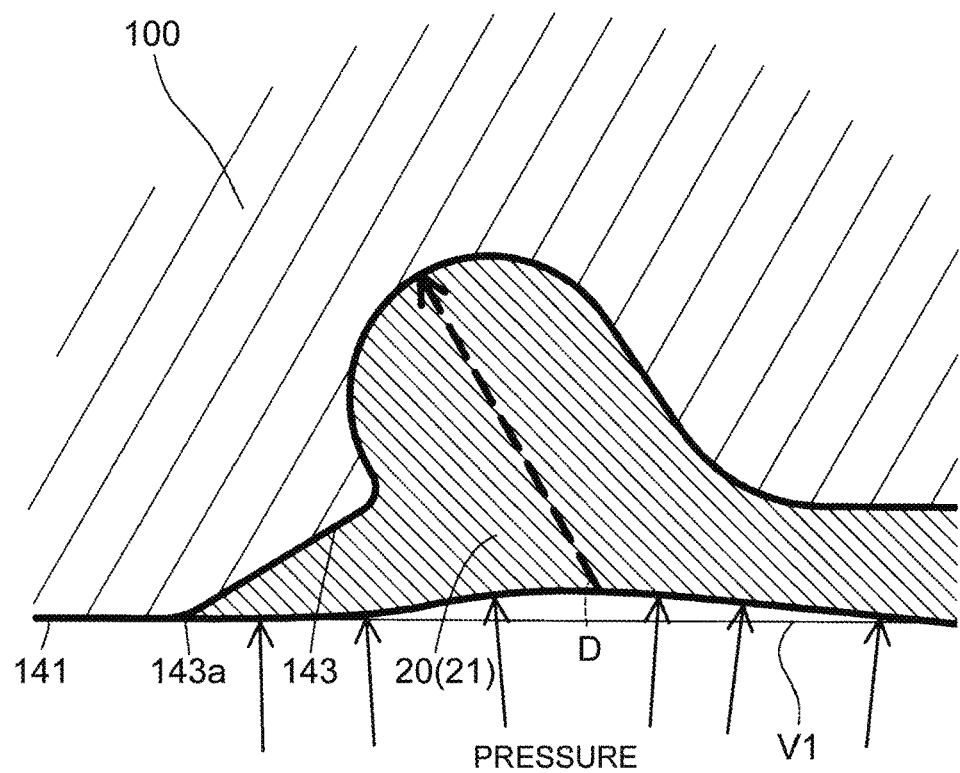
FIG. 8 is a sectional view illustrating a state where a gap has disappeared.

Next will be described about the crushing of the gap G. FIG. 8 is a sectional view illustrating a state where the gap G has disappeared by crushing the gap G. Since the opening-side divided liner 21 is made of resin, the opening-side divided liner 21 deforms by creep depending on a temperature and a pressure. When the opening-side divided liner 21 receives a pressure from the tank interior, the gap G is gradually reduced as the creep deformation progresses. Eventually, as illustrated in FIG. 8, the annular groove 147 is filled with the opening-side divided liner 21, so that the gap G disappears.

In order that the gap G disappears within ten minutes by increasing the speed of the creep deformation, a temperature of helium gas sealed in the tank interior is set to 60° C. The temperature setting is implemented by adjusting a temperature of precooling. The precooling is to cool helium before the sealing in order to offset a temperature rise due to the sealing. The temperature rise due to the sealing occurs by increasing a pressure to 70 MPa at the time of the sealing. As such, the gap G formed between the opening-side divided liner 21 and the annular groove 147 due to the cooling in the insert molding is buried by causing the opening-side divided liner 21 to flow such that a temperature and a pressure of a fluid that makes contact with the inner peripheral surface of the opening-side divided liner 21 are kept at predetermined values or more. The inner peripheral surface of the opening-side divided liner 21 is a surface exposed to the tank interior.

When the gap G disappears as such, it is possible to avoid such a situation that the gas in the tank interior penetrates an inside of the opening-side divided liner 21 and accumulates in the gap G. Further, when the opening-side divided liner 21 makes contact with the whole annular groove 147, a stress of the opening-side divided liner 21 around the annular groove 147 disperses. Further, when the creep deformation occurs, a residual stress is released. Due to these operations, durability of the opening-side divided liner 21 improves.

As illustrated in FIG. 8, the radially inner end of the opening-side divided liner 21 is placed on the inclined surface 143. More specifically, the radially inner end of the opening-side divided liner 21 is placed at a boundary between the inner-surface connecting part 143*a* and the inner surface part 141. In the present application, the boundary is also included in the inclined surface 143.

That the radially inner end of the opening-side divided liner 21 is placed on the inclined surface 143 means that the opening-side divided liner 21 is not placed on the inner surface part 141. On this account, the radially inner end of the opening-side divided liner 21 is placed on the radially outer side relative to a predetermined position H (see FIG. 14) on the inner surface part 141.

In the present embodiment, in order to surely avoid such a situation that the radially inner end of the opening-side divided liner 21 is placed on the radially inner side relative to the predetermined position 1H, the radially inner end of the opening-side divided liner 21 is placed on the inclined surface 143. Further, since the opening-side divided liner 21 is inclined toward the tank interior, even if hydrogen enters from the boundary between the opening-side divided liner 21 and the opening-side flange 120, the hydrogen is further easily discharged to the tank interior. On this account, a force that acts to separate the opening-side divided liner 21 due to accumulated hydrogen decreases, so that the sealing characteristic can be secured.

Further, in the present embodiment, the opening-side divided liner 21 does not protrude from the inner surface part 141 toward the end side. That is, the opening-side divided liner 21 makes contact with a virtual plane V1 that makes contact with the inner surface part 141 or is recessed from the virtual plane V1 toward the opening side. The reason why the opening-side divided liner 21 has such a structure is because the creep deformation described in FIG. 8 occurs and the gap G is buried. Accordingly, a part where the opening-side divided liner 21 is recessed toward the opening side is a part corresponding to the annular groove 147 in the axis-O direction within a part exposed to the internal space. With this structure, it is possible to avoid such a situation that a pressure (hereinafter referred to as the internal pressure) of the tank interior acts to pull off the opening-side divided liner 21 on the inclined surface 143 toward the radially outer side.

The structure to secure the sealing characteristic as described so far is obtained by numerical calculation and experiment for various dimensions and shapes.

The following describes numerical calculation performed for determination of the angle θ. At the time when the internal pressure was generated, if a contact pressure larger than the internal pressure was generated on a contact face between the opening-side divided liner 21 and the inclined surface 143, it was determined that a calculated angle came up to the standard, but if not, it was determined that the calculated angle did not come up to the standard. As a result of this, in a case where the angle θ was 120 degrees, the angle θ did not come up to the standard. In contrast, in either case where the angle θ was 40 degrees, 60 degrees, or 90 degrees, the angle θ came up to the standard. In either case of 40 degrees, 60 degrees, and 90 degrees, a contact pressure larger than the internal pressure was generated at least at the corner part 145. In view of this, the present embodiment may employ 90 degrees.

As described above, one of the reasons why the contact pressure larger than the internal pressure is generated at the corner part 145 is that the recess direction D (FIGS. 3, 8) has a radially inner component. When the internal pressure acts, an internal stress along the recess direction D is generated in the opening-side divided liner 21, near the annular groove 147. The internal stress generates a high contact pressure with respect to the corner part 145. The contact pressure thus generated is combined with a contact pressure (FIG. 7) generated at the time of manufacture, thereby achieving a high sealing characteristic at the corner part 145. Further, the corner part 145 is placed on the radially inner side relative to the annular groove 147, that is, in a boundary between the liner 20 and the mouth piece 100 in the section illustrated in FIG. 3, the corner part 145 is placed on the side closer to the inner surface part 141 than the outer surface 147*s*. Accordingly, hydrogen entry to the annular groove 147 is inhibited by the sealing at the corner part 145.

The reason why the inclined surface 143 is subjected to the thermo compression bonding in S340 as described above is to restrain the opening-side divided liner 21 from being separated from the inclined surface 143. When a high contact pressure acts on the corner part 145, an internal stress to cause the separation is generated. In the present embodiment, in anticipation of the internal stress, the opening-side divided liner 21 is bonded to the inclined surface 143.

In the meantime, by prescribing a surface roughness at the corner part 145 at which the high contact pressure is generated as described above, it is considered that the sealing characteristic further improves. In view of this, an airtight test to prescribe the surface roughness was performed. However, it takes effort to perform S310 to S390 to prepare a test sample for one airtight test. In view of this, in the present embodiment, an airtight test by use of a test piece to omit this effort was employed.

Figure 9:
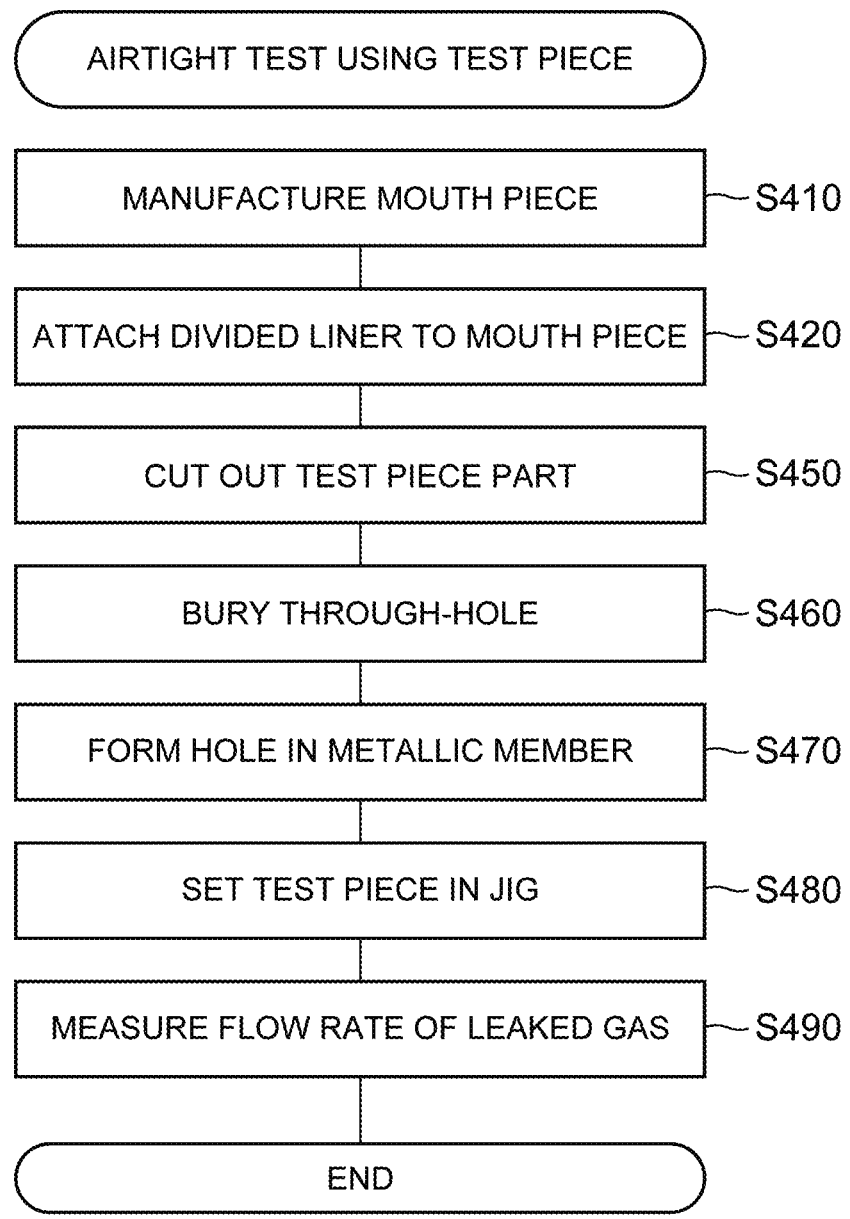
FIG. 9 is a flowchart illustrating a procedure of an airtight test by use of a test piece.

FIG. 9 is a flowchart illustrating a procedure of an airtight test by use of a test piece 500. S410 to S420 are the same as S310 to S320 in the manufacturing method (FIG. 5) of the high pressure tank 10, so the description about S410 to S420 is omitted. Thus, by performing S410 to S420 in the same manner as the manufacturing method of the high pressure tank, a sealing characteristic in the high pressure tank 10 is easily replicated.

After S420, an opening-side divided liner 21 and a mouth piece 100 are partially cut out (S450). The part to be cut is a part 8 illustrated in FIG. 2.

Then, a through-hole 111 is buried (S460). S460 is performed so as to prevent gas from leaking from the through-hole 111 in the airtight test (S480 to be described later). More specifically, the through-hole 111 is buried by a metallic material by use of a screw mechanism or an adhesive.

Subsequently, a hole 510 (see FIGS. 11, 12) is opened in the test piece 500 (S470). In S470, the test piece 500 (FIG. 10) is completed. The hole 510 will be described later with reference to FIG. 12.

Figure 10:
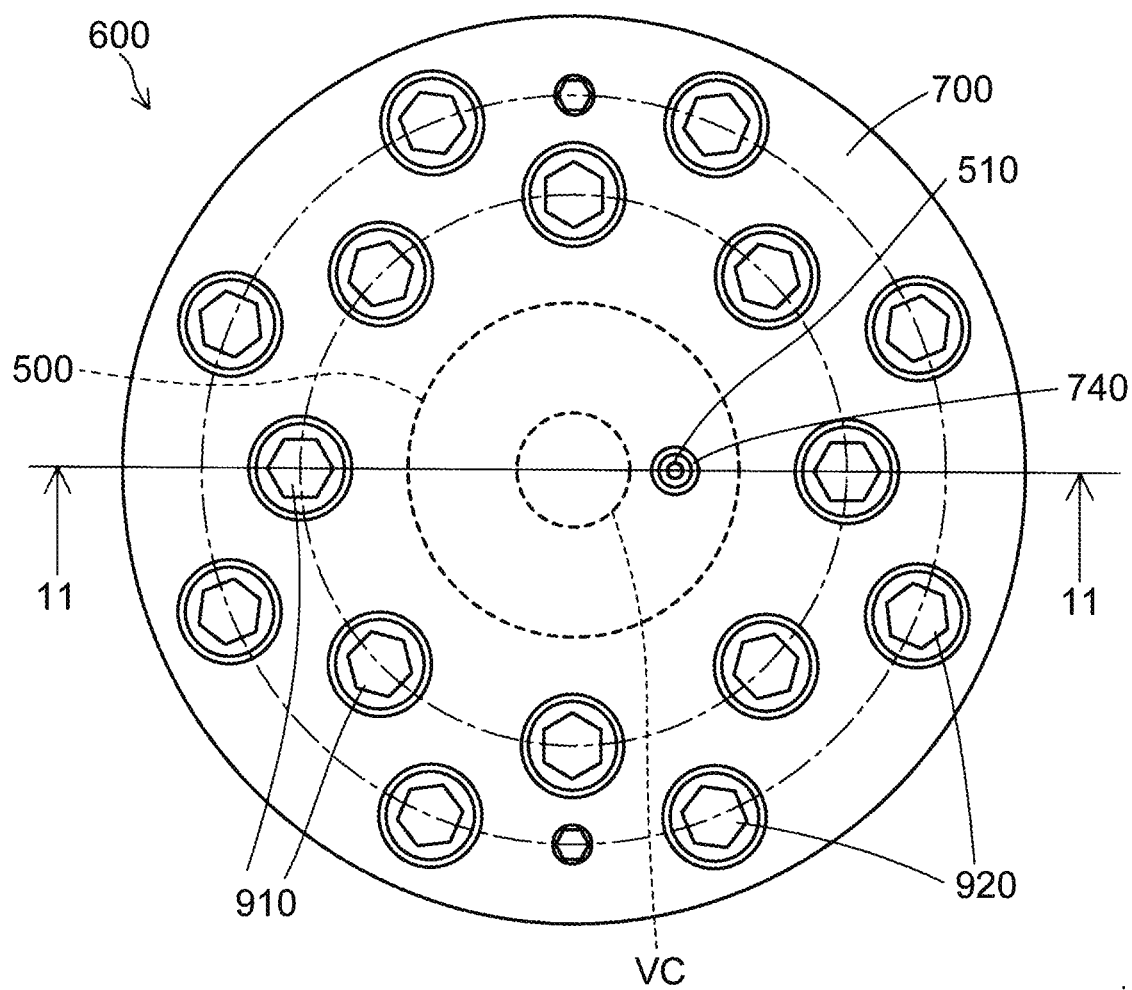
FIG. 10 is a top view of a jig in which a test piece is set.
Figure 11:
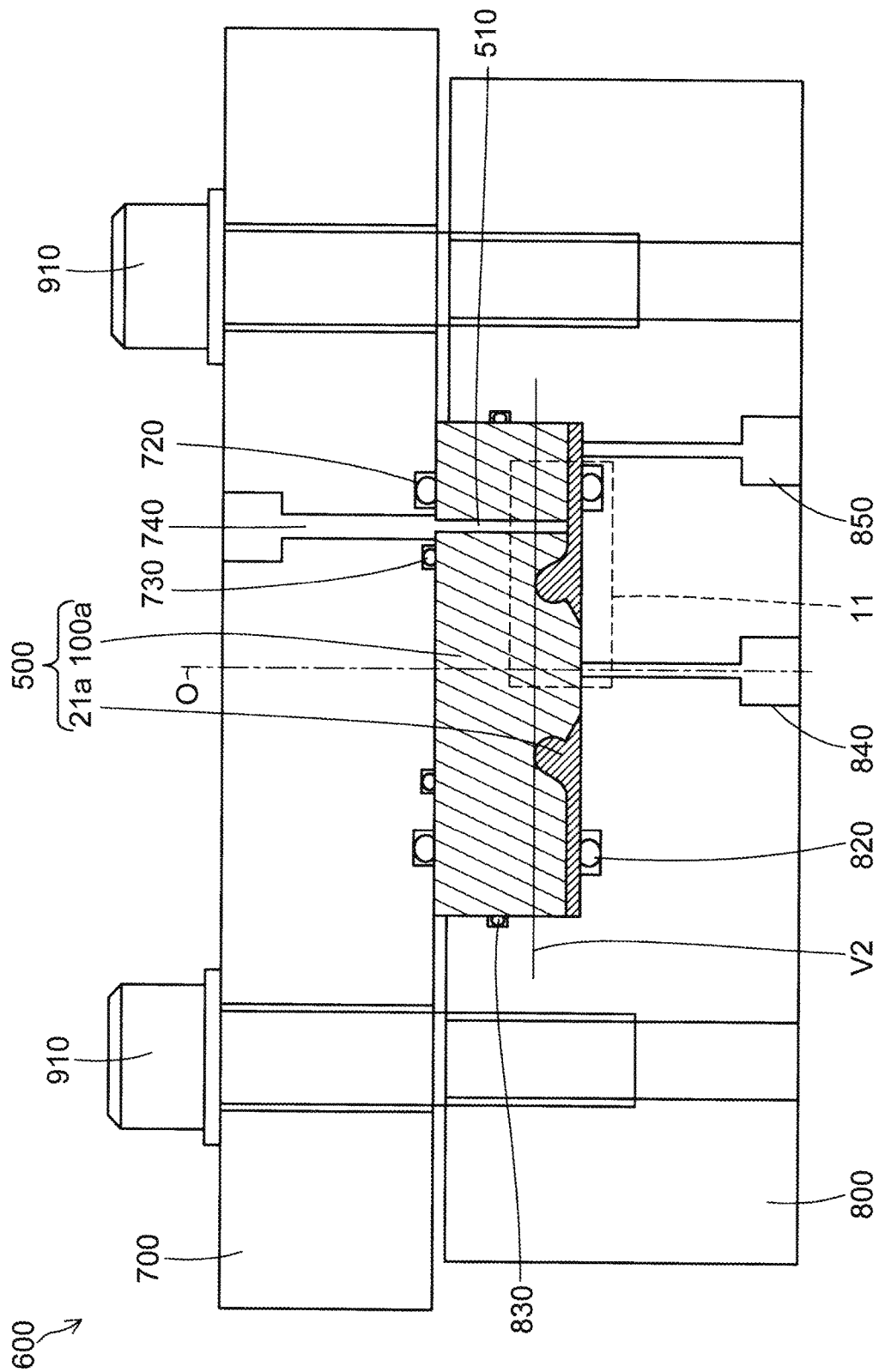
FIG. 11 is a sectional view taken along a line 11-11 in FIG. 10.

Then, the test piece 500 is set in a jig 600 (S480), and the airtight test is performed (S490). FIG. 10 is a top view of the jig 600 in which the test piece 500 is set therein. FIG. 11 is a sectional view taken along a line 11-11 in FIG. 10. FIG. 11 illustrates a cut surface including an axis O. The axis O passes through a center of a circle VC and is perpendicular to a virtual tangent plane V2. The circle VC is a tangent of the annular groove 147 and the virtual tangent plane V2.

As illustrated in FIG. 11, the jig 600 includes an upper member 700 and a lower member 800. The test piece 500 is inserted into a rectangular recess provided in the lower member 800, and a top face of the test piece 500 makes contact with the upper member 700.

The test piece 500 is constituted by a resin member 21a and a metallic member 100a. The resin member 21a is a part molded as the opening-side divided liner 21. The metallic member 100a is a part molded as the mouth piece 100.

Figure 12:
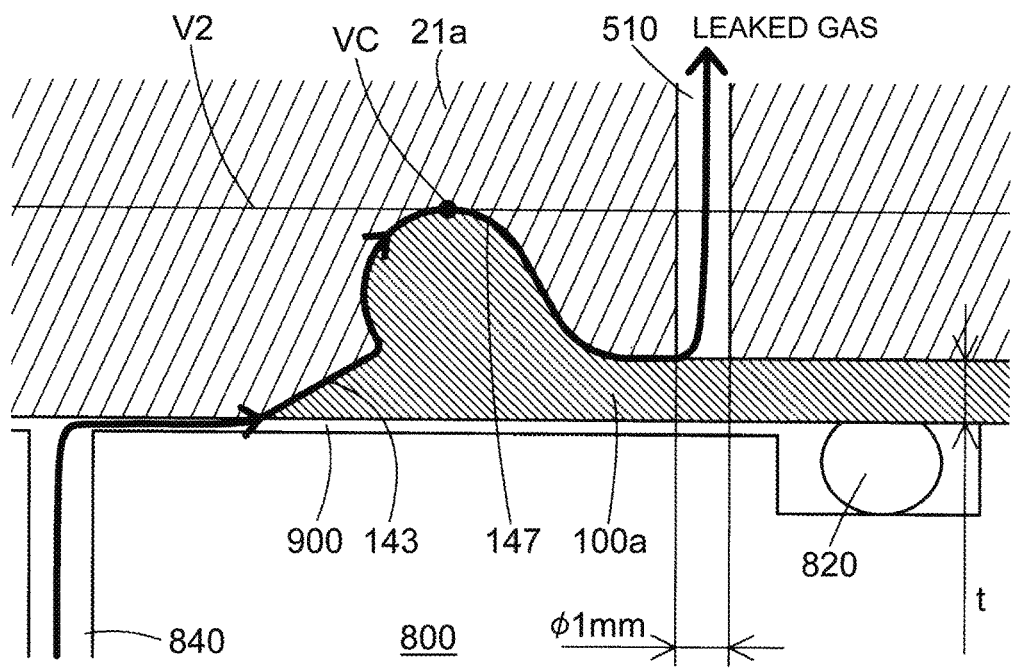
FIG. 12 is an enlarged view of a part 11 in FIG. 11.

FIG. 12 is an enlarged view of a part 11 in FIG. 11. The airtight test is performed as follows: high-pressure gas (more specifically, high-pressure helium) is caused to flow into a gap 900 formed between the upper member 700 and the lower member 800, via an entrance channel 840 provided in the lower member 800, and an amount of gas that flows out from an outlet channel 740 provided in the upper member 700 is measured. In the present embodiment, a volume flow is measured.

A discharge channel 850 functions as a discharge channel for the high-pressure gas at the time when first bolts 910 and second bolts 920 (described later) are loosened after the airtight test.

In order to implement the above measurement, the hole 510 is provided as described above (S470). The hole 510 penetrates through the metallic member 100a so as to expose the resin member 21a. A part to be exposed is an outer surface part 149. That is, the part to be exposed is placed on an outer side relative to a part where a sealing function is shown by an inclined surface 143 and a corner part 145. The outer side as used herein indicates a direction distanced from an inner-surface connecting part 143a of the resin member 21a, along a boundary between the resin member 21a and the metallic member 100a in a section illustrated in FIG. 12. When the sealing function is shown normally, the amount of gas to flow into the hole 510 is zero or a very small amount.

An inside diameter of the hole 510 in the present embodiment is set to 1 mm. If the diameter of the hole 510 is too large, the resin member 21a may receive a pressure from the gap 900 so as to deform by creep and to enter the hole 510. In order to reduce or prevent this occurrence, it is found from experiment that the diameter of the hole 510 is set to 1 mm or less in the present embodiment. However, it is considered that a value of 1 mm or less depends on, e.g., a material of the resin member 21a and a thickness t of a part that faces the hole 510, so the value may be changed appropriately.

Note that a radially outer end of the inclined surface 143 included in the resin member 21a is closer to the virtual tangent plane V2 than a radially inner end thereof. That is, the inclined surface 143 is inclined from an inner side to an outer side in the radial direction so as to approach the virtual tangent plane V2. As illustrated in FIGS. 11, 12, the virtual tangent plane V2 is a virtual plane that makes contact with an annular groove 147. That the radially outer end is closer to the virtual plane that makes contact with the annular groove 147 than the radially inner end applies to the inclined surface 143 included in the opening-side divided liner 21.

As illustrated in FIGS. 10, 11, the upper member 700 and the lower member 800 are fastened by eight first bolts 910 and eight second bolts 920. Axis directions of the first bolts 910 and the second bolts 920 are parallel to the axis O. By adjusting a fastening power or by adjusting a thickness of the upper member 700, a force that the mouth piece 100 receives from the reinforcing layer 30 in the high pressure tank 10 can be replicated as a force that the metallic member 100a receives from the upper member 700.

The eight first bolts 910 are placed on a concentric circle. The eight second bolts are placed on a concentric circle having a diameter larger than the circle on which the first bolts 910 are placed. With such a structure in which the bolts are placed on two concentric circles as such, it is possible to generally equalize in-plane distribution of the fastening power between the upper member 700 and the lower member 800.

Further, in order to perform the airtight test normally, four O-rings 720, 730, 820, 830 are provided as illustrated in FIG. 11. The O-rings 720, 730 prevent gas leakage from a joining part between the hole 510 and the outlet channel 740. The O-rings 820, 830 prevent gas leakage from between the test piece 500 and the lower member 800.

By the airtight test using the test piece 500, leak rates (ml/h) of the gas by changing a surface roughness of the corner part 145 were measured. In a case where the maximum height was 2.8 μm and 7.6 μm, the leak rate was approximately 0. In the meantime, in a case where the maximum height was 23 μm, the leak rate was 18 mL/h. As a result, it is considered that, if the maximum height is 7.6 μm or less, the gas leak rate is approximately 0. In the present embodiment, the maximum height was defined as 6.3 μm or less according to the JIS standard.

Figure 13:
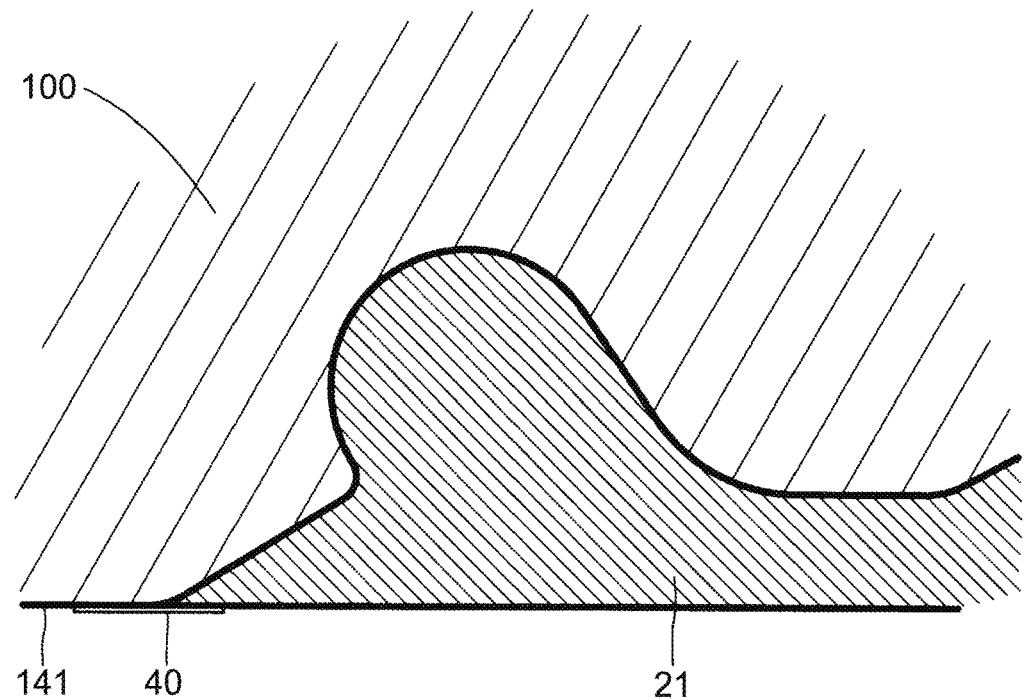
FIG. 13 is a sectional view illustrating a state where a tape is stuck.

The following describes a modification. FIG. 13 is a sectional view illustrating a state where a tape 40 is stuck over a boundary between an opening-side divided liner 21 and a mouth piece 100. More specifically, the tape 40 is stuck over a boundary between the opening-side divided liner 21 and an inner surface part 141.

By sticking the tape 40 as described above, a radially inner end of the opening-side divided liner 21 is sealed. This consequently may make it difficult for hydrogen to enter from the boundary between the opening-side divided liner 21 and the mouth piece 100. This can further increase a sealing characteristic.

In the manufacturing method of the high pressure tank 10, the sticking of the tape 40 may be performed after S340 or may be performed instead of S340.

The tape 40 may be also stuck over a boundary between an end-side divided liner 22 and a boss 200, in addition to the boundary between the opening-side divided liner 21 and the mouth piece 100. Alternatively, the tape 40 may be stuck over the boundary between the end-side divided liner 22 and the boss 200, without sticking the tape 40 on the boundary between the opening-side divided liner 21 and the mouth piece 100.

Figure 14:
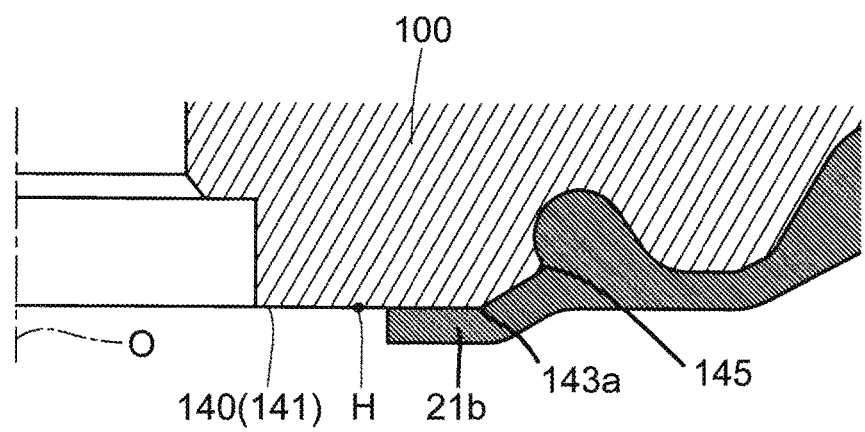
FIG. 14 is a sectional view illustrating a modification.

The following describes another modification. FIG. 14 is a sectional view illustrating a configuration including an opening-side divided liner 21b instead of the opening-side divided liner 21. As illustrated in FIG. 14, a radially inner end of the opening-side divided liner 21b on a bottom-face-140 side is placed on a radially inner side relative to an inner-surface connecting part 143a. On this account, the opening-side divided liner 21b makes contact with an inner surface part 141, and part of the inner surface part 141 is exposed to a tank interior. Even if the opening-side divided liner 21b has such a shape, a high sealing characteristic by a corner part 145 is achievable as described above.

Figure 15:
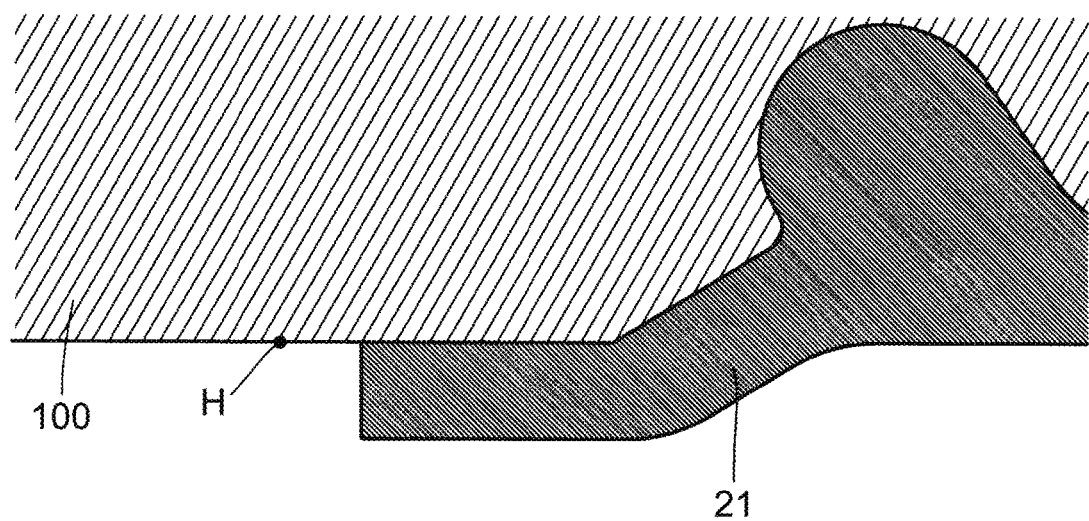
FIG. 15 is an enlarged view of the modification.

FIG. 15 is an enlarged view around a radially inner end of the opening-side divided liner 21b. In the present modification, as illustrated in FIGS. 14, 15, the radially inner end of the opening-side divided liner 21b is placed on a radially outer side relative to a predetermined position H, which is described with reference to FIG. 8. On this account, no gas is accumulated between the opening-side divided liner 21b and the mouth piece 100.

Figure 16:
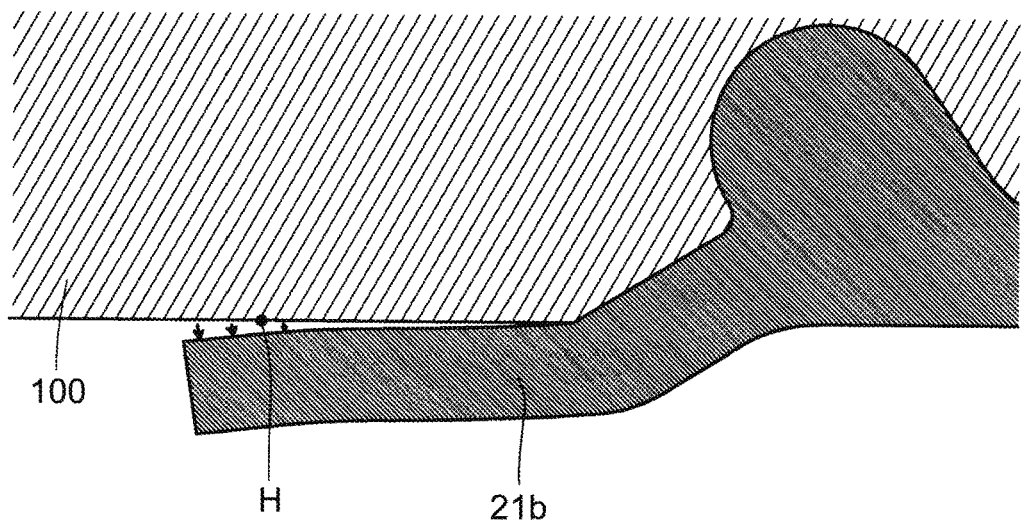
FIG. 16 is a view illustrating a comparative example.
Figure 17:
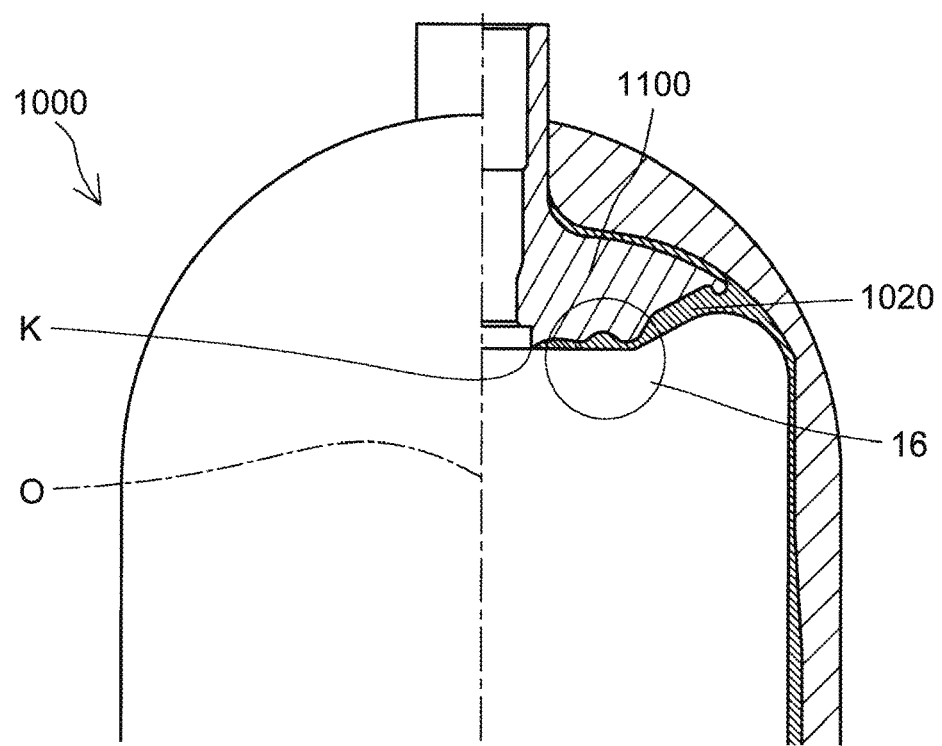
FIG. 17 is a sectional view illustrating a state where gas stored in a high pressure tank enters an interface between a liner and a mouth piece.
Figure 18:
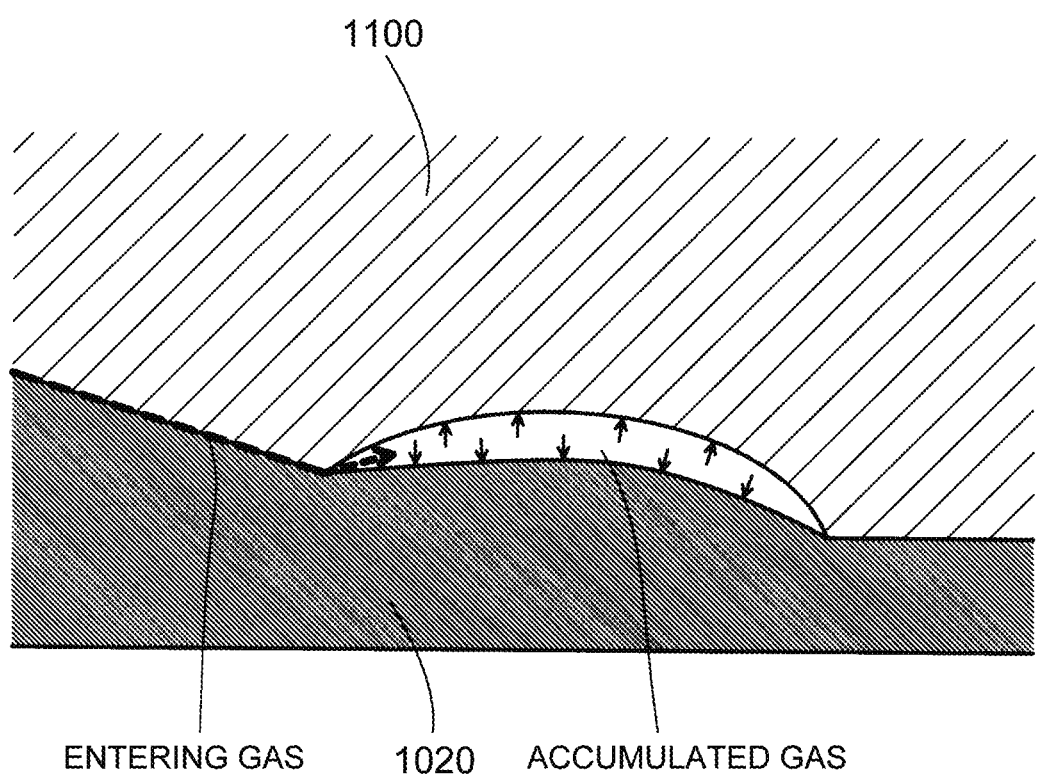
FIG. 18 is an enlarged view of FIG. 17.

FIG. 16 is a view illustrating a comparative example. In this comparative example, a radially inner end of an opening-side divided liner 21b is placed on the radially inner side relative to the predetermined position H. As described above, when the radially inner end of the opening-side divided liner 21b is placed on the radially inner side relative to the predetermined position H, a space where a fluid enters between a liner 20 and a mouth piece 100 becomes large between the radially inner end and a corner part 145. This makes it difficult to secure a contact pressure applied to the corner part 145. In contrast, when the radially inner end of the opening-side divided liner 21b is placed on the radially outer side relative to the predetermined position H, a space where a fluid enters between the liner 20 and the mouth piece 100 becomes small between the radially inner end and the corner part 145, so that a contact pressure to the corner part 145 is maintained. That is, the predetermined position H is a critical position to secure a high sealing characteristic at the corner part 145. In the present modification, the predetermined position H may be found by numerical simulation. If a material or an outer shape changes, its range may be found each time.

The following describes further another modification. In attachment (S330) of an opening-side divided liner 21 to a mouth piece 100, the opening-side divided liner 21 may be bonded to an inner conical surface part 147c. If they are bonded as such, a gap G (FIG. 7) is hard to generate after insert molding (S330).

As an implementation of the bonding, an adhesive may be applied to the inner conical surface part 147c, for example. Alternatively, the inner conical surface part 147c may be etched in advance, and after the insert molding (S330), the opening-side divided liner 21 may be bonded to the inner conical surface part 147c by thermo compression bonding.

The following describes further another modification. A boss 200 may not have shapes of an inclined surface 243, a corner part 245, an annular groove 247, and so on. In this case, for example, an entire outer peripheral surface of the boss 200 on a tank-interior side may be coated with an end-side divided liner 22. With such a configuration, it is possible to prevent hydrogen from leaking from a boundary between the end-side divided liner 22 and the boss 200. In order to realize the coating, an inner hole 219 may not be provided.

Figure 19:
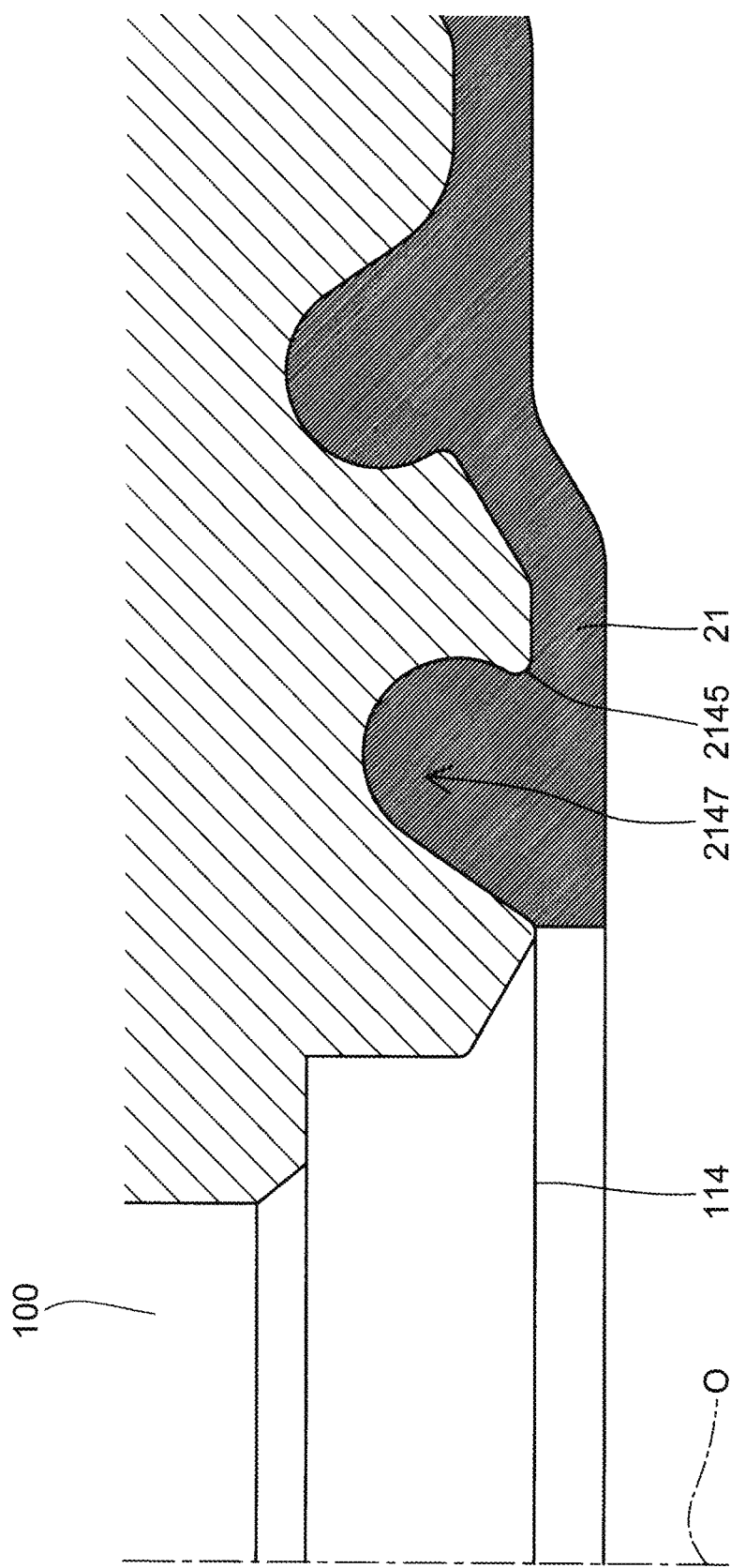
FIG. 19 is a sectional view around a mouth piece (a modification A)
Figure 20:
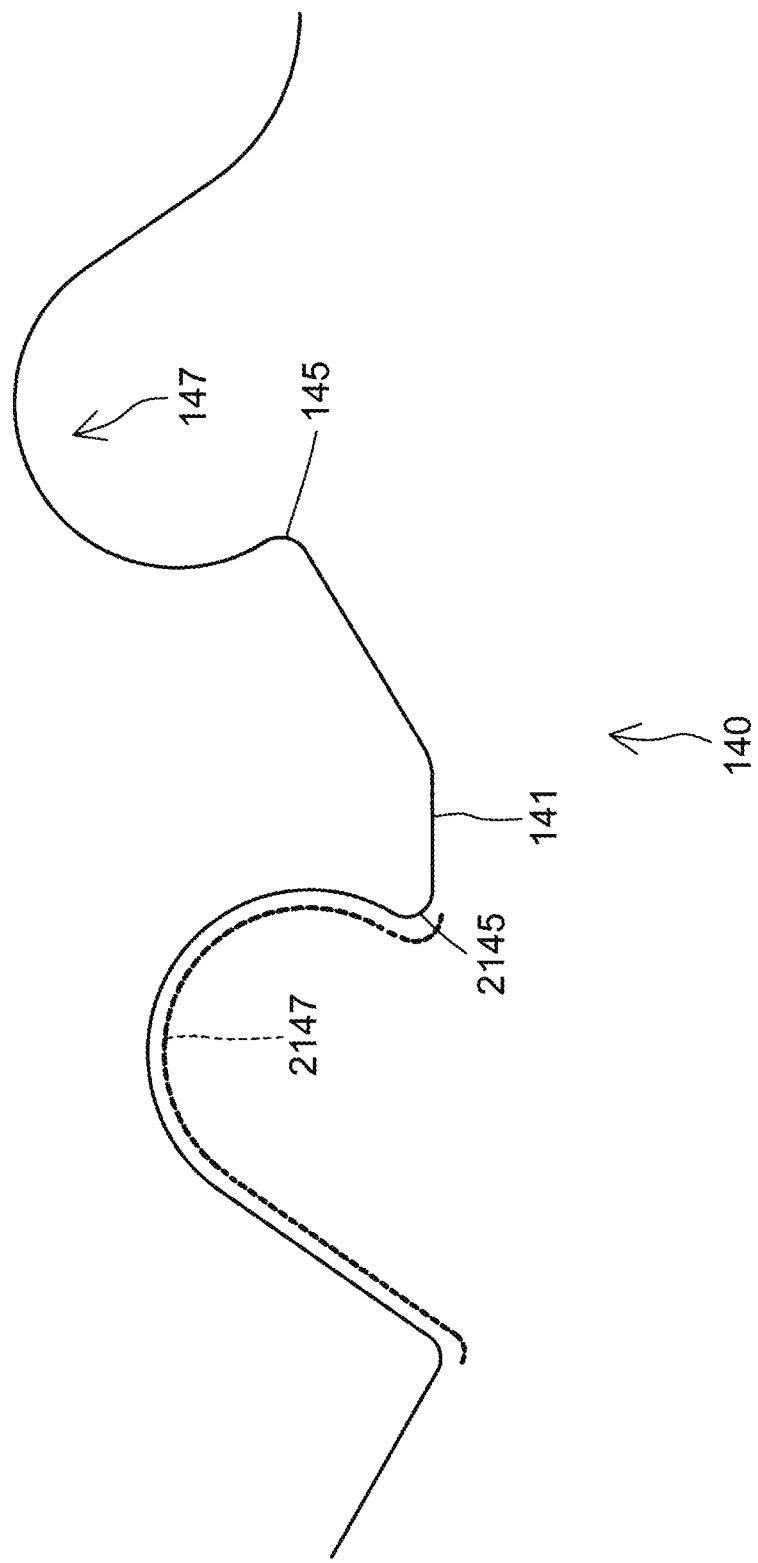
FIG. 20 is a sectional view around the mouth piece (the modification A)

The following describes further another modification. FIGS. 19 and 20 are sectional views around a mouth piece 100 in the modification (hereinafter referred to as the modification A). In FIG. 20, an opening-side divided liner 21 is not illustrated. A bottom face 140 in the modification A includes a hooking groove 2147. The hooking groove 2147 is filled with the opening-side divided liner 21.

The hooking groove 2147 is provided on the radially inner side relative to an annular groove 147 and on the radially outer side relative to a connection opening 114. The hooking groove 2147 is formed in an annular shape, and has a symmetric shape around an axis O. The hooking groove 2147 includes a hooking corner part 2145 on a radially outer surface. The opening-side divided liner 21 makes contact with the hooking corner part 2145.

A sectional shape of the hooking corner part 2145 is an R-shape. A projecting direction of the hooking corner part 2145 includes a radially inner component. More specifically, the projecting direction of the hooking corner part 2145 includes the radially inner component and an end-side component in the axis-O direction. In the present application, that the projecting direction of the hooking corner part 2145 includes the radially inner component is also expressed such that "the hooking corner part 2145 projects radially inwardly."

Figure 21:
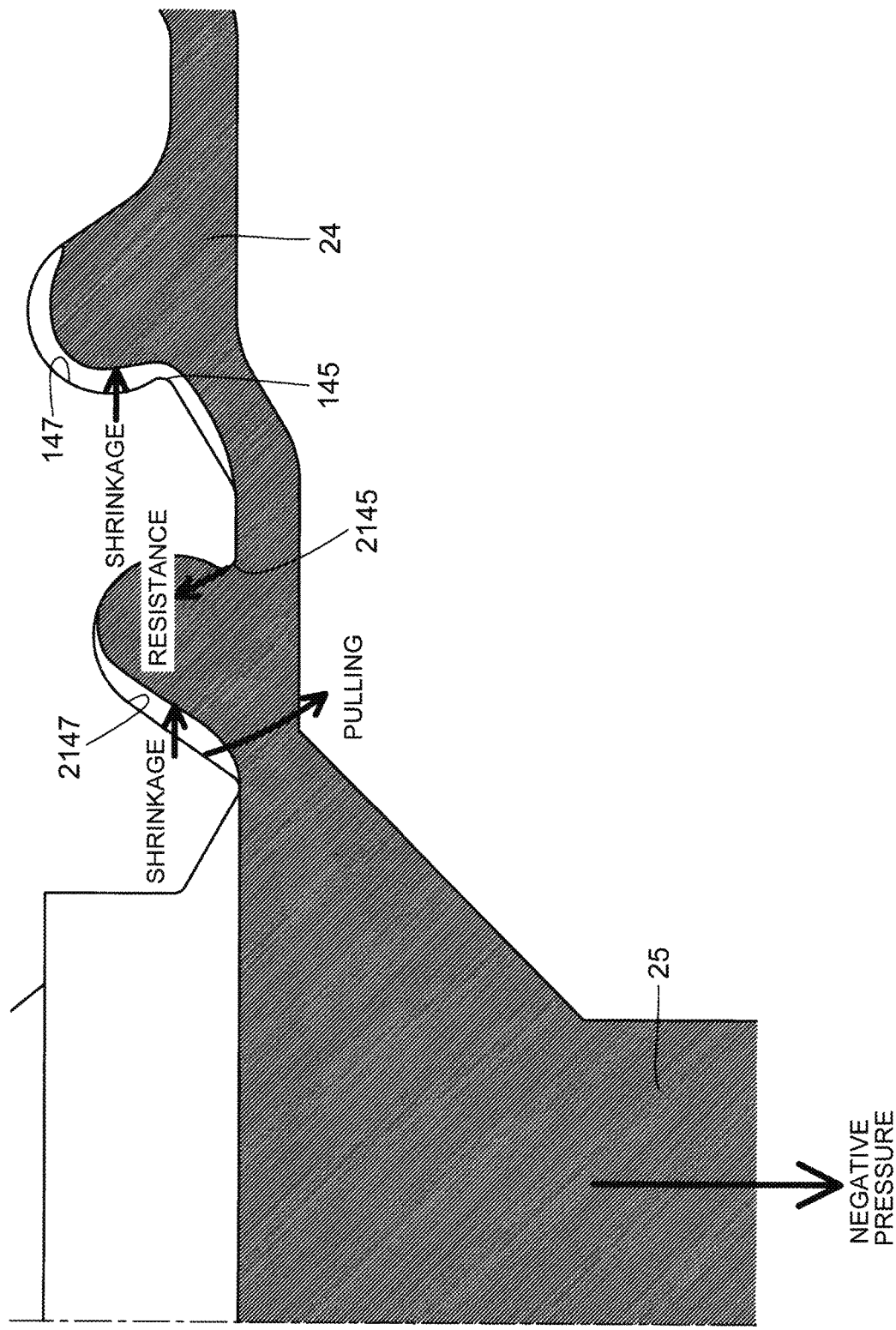
FIG. 21 is a sectional view illustrating a state of insert molding (the modification A)

FIG. 21 is a sectional view illustrating a state of insert molding in the modification A. FIG. 21 illustrates a state where a resin material 24 is poured and cooled off to shrink. The shrinkage of the resin material 24 often occurs radially inwardly as described with reference to FIG. 7. However, the shrinkage of the resin material 24 may also occur radially outwardly as illustrated in FIG. 21. In such a case, the resin material 24 is separated from a bottom face 140 at a radially inner part of the hooking groove 2147 and at a radially inner part of the annular groove 147. As a result, the resin material 24 is separated from the bottom face 140 at a corner part 145.

After the cooling of the resin material 24, a mold for insert molding is taken off as described above. At the time when the mold is taken off as such, a force to pull the resin material 24 toward the end side in the axis-O direction may act on the resin material 24 due to an occurrence of a negative pressure. When such a force acts, no resistance to the force is generated because the resin material 24 is distanced from around the corner part 145.

In contrast, the resin material 24 is pressed against around the hooking corner part 2145 at a strong contact pressure due to the shrinkage, and the hooking corner part 2145 projects radially inwardly. Accordingly, the opening-side divided liner 21 filled into the hooking groove 2147 is caught on the hooking groove 2147. As a result, a resistance to the pulling force is generated. This accordingly may prevent the resin material 24 from being separated due to taking-off of a mold. The separation as used herein can be to separate the resin material 24 from the bottom face 140 on the radially outer side relative to the hooking corner part 2145. Note that a gap generated by the shrinkage may disappear by the airtight test described as S390.

In the meantime, as described with reference to FIG. 6, in a case where the resin material 24 shrinks radially outwardly, a resistance to a force to pull the resin material 24 toward the end side in the axis-O direction is generated at the corner part 145. On this account, even if shrinkage occurs in either direction along the radial direction, the resin material 24 is prevented from separating from the bottom face 140 on the radially outer side relative to the corner part 145.

Figure 22:
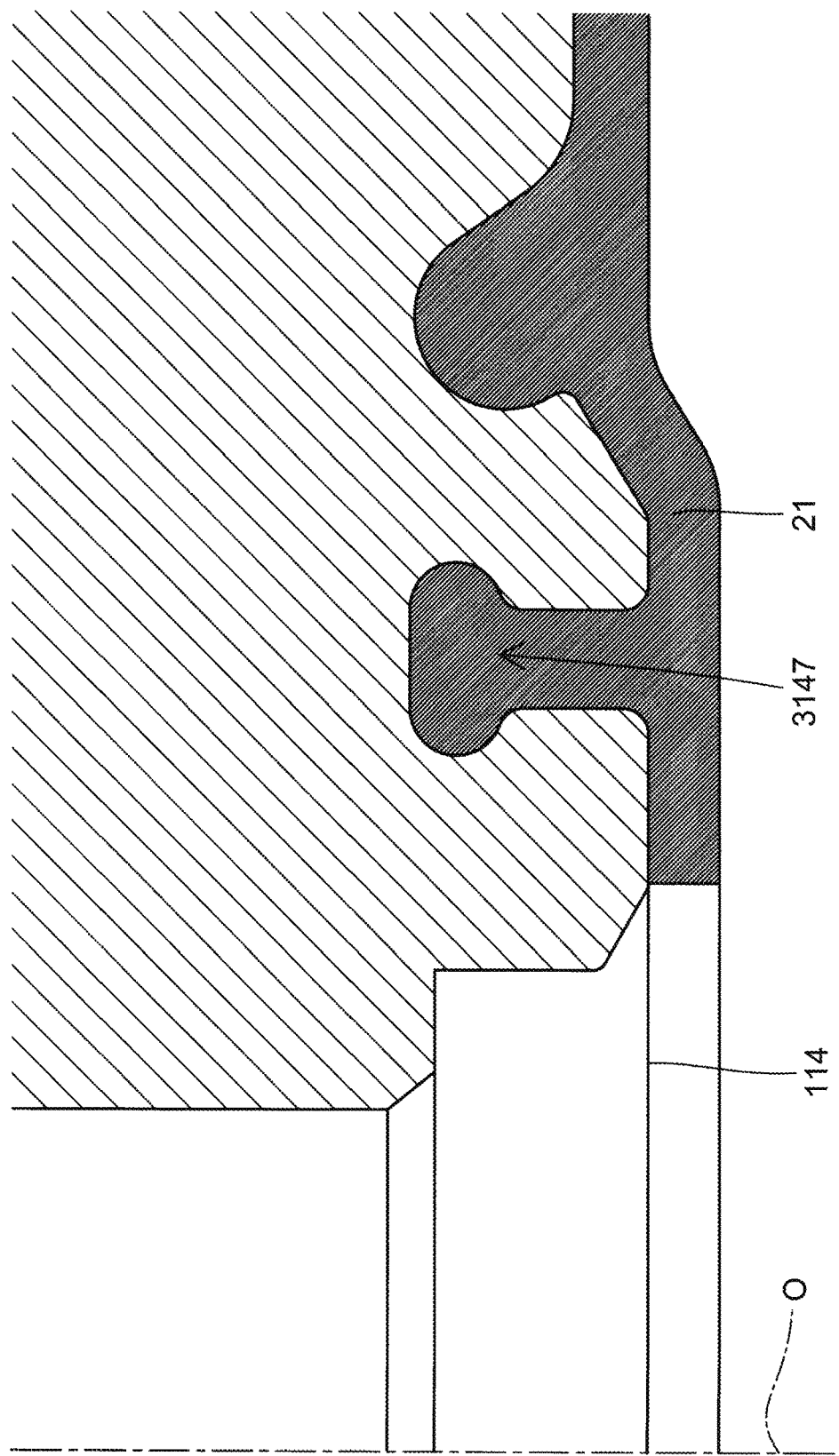
FIG. 22 is a sectional view around the mouth piece (a modification B)
Figure 23:
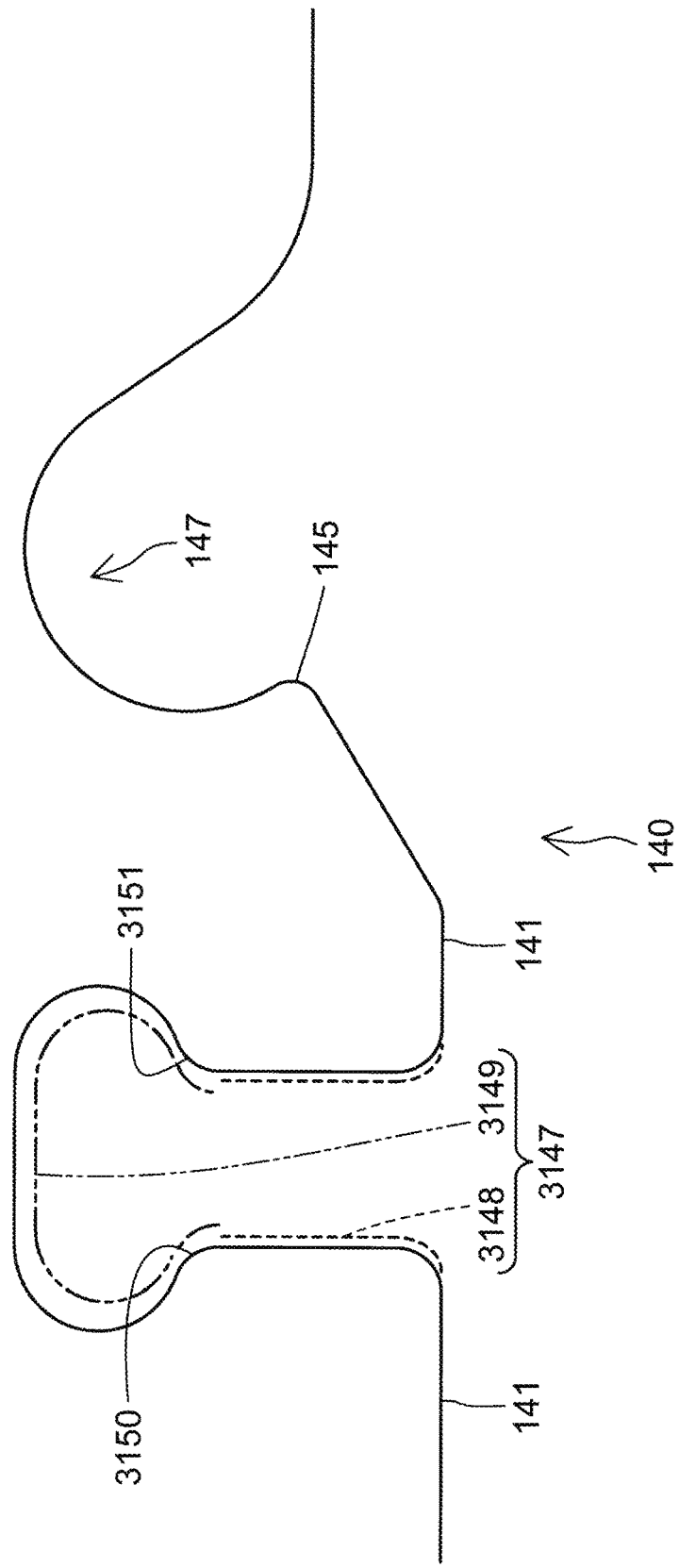
FIG. 23 is a sectional view around the mouth piece (the modification B)

The following describes further another modification. FIGS. 22 and 23 are sectional views around a mouth piece 100 in the modification (hereinafter referred to as the modification B). In FIG. 23, an opening-side divided liner 21 is not illustrated. A bottom face 140 in the modification B includes a hooking groove 3147. The hooking groove 3147 is filled with the opening-side divided liner 21.

The hooking groove 3147 is provided on a radially inner side relative to an annular groove 147 and on a radially outer side relative to a connection opening 114. The hooking groove 3147 is formed in an annular shape, and has a symmetric shape around an axis O.

The hooking groove 3147 includes a straight part 3148 and a widened part 3149. A hooking corner part 3150 is formed at a boundary, on the radially inner side, between the straight part 3148 and the widened part 3149. A hooking corner part 3151 is formed at a boundary, on the radially outer side, between the straight part 3148 and the widened part 3149. The opening-side divided liner 21 makes contact with the hooking corner parts 3150, 3151.

The straight part 3148 is a part that is hollowed, along an axis-O direction, from an inner surface part 141 toward an open-side in the axis-O direction. A sectional shape of the straight part 3148 is a generally rectangular shape.

The widened part 3149 is a part connected to the straight part 3148 on the open side in the axis-O direction. A sectional shape of the widened part 3149 is a generally elliptical shape. Note that an open-side end of the widened part 3149 in the axis-O direction in its section is parallel to the radial direction.

A radially inner end of the widened part 3149 is placed on the radially inner TFN 150312-US side relative to a radially inner end of the straight part 3148. On this account, a projecting direction of the hooking corner part 3150 includes a radially outer component. More specifically, the projecting direction of the hooking corner part 3150 includes the radially outer component and an open-side component in the axis-O direction. In the present application, that the projecting direction of the hooking corner part 3150 includes the radially outer component is also expressed such that "the hooking corner part 3150 projects radially outwardly."

A radially outer end of the widened part 3149 is placed on the radially outer side relative to a radially outer end of the straight part 3148. On this account, a projecting direction of the hooking corner part 3151 includes a radially inner component. More specifically, the projecting direction of the hooking corner part 3151 includes the radially inner component and an open-side component in the axis-O direction. In the present application, that the projecting direction of the hooking corner part 3151 includes the radially inner component is also expressed such that "the hooking corner part 3151 projects radially inwardly."

Figure 24:
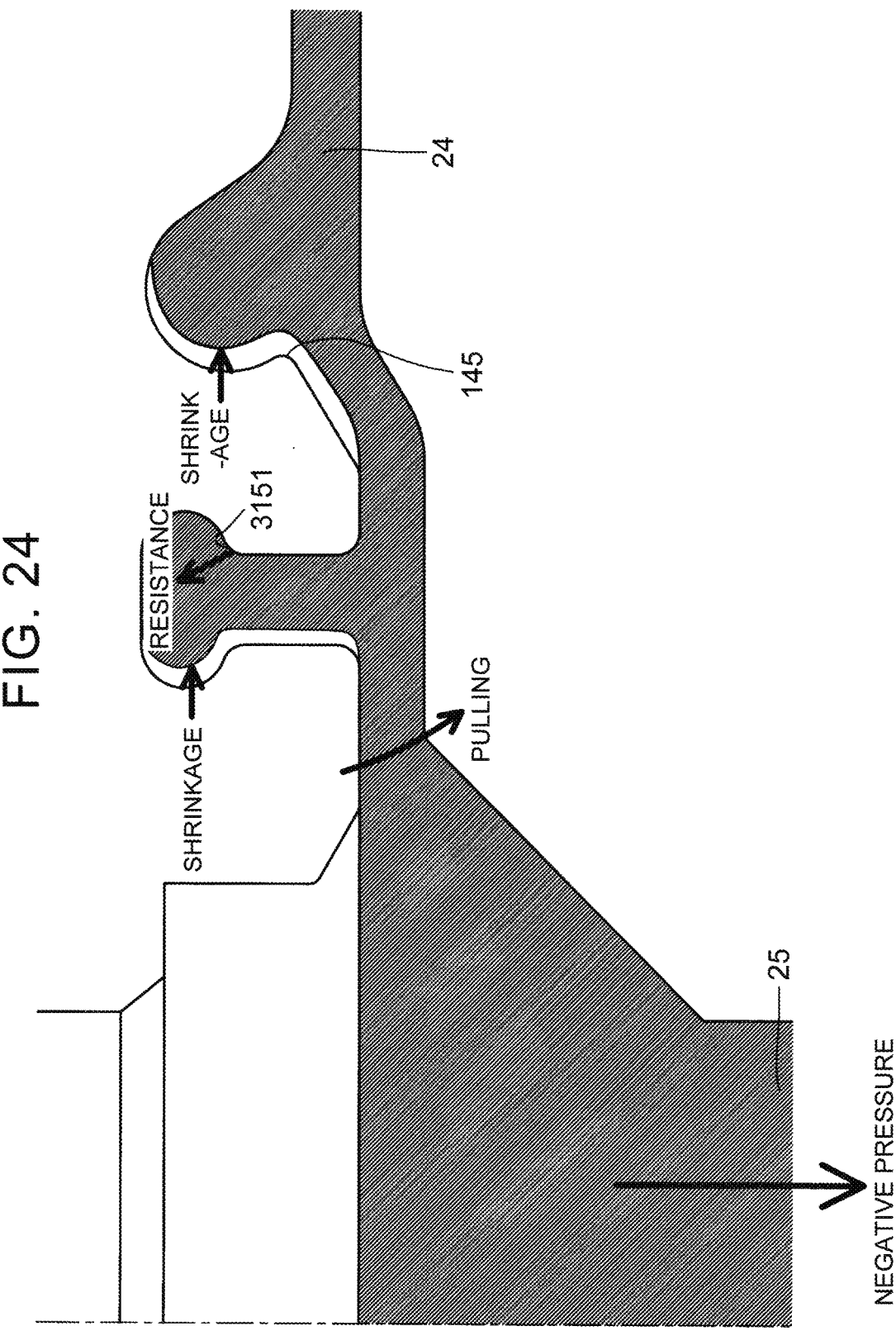
FIG. 24 is a sectional view illustrating a state of insert molding (the modification B)

FIG. 24 is a sectional view illustrating a state of insert molding in the modification B. Similarly to a case illustrated in FIG. 21 described as the modification A, FIG. 24 illustrates a case where shrinkage occurs radially outwardly. In such a case, similarly to the case of the modification A, a resin material 24 is separated from a bottom face 140 at a radially inner part of the hooking groove 3147 and at a radially inner part of the annular groove 147.

Even in the modification B, a resistance to a pulling force is generated at the time when a mold is taken off. The resistance is generated at least at the hooking corner part 3151. The reason why the resistance is generated at the hooking corner part 3151 is because the hooking corner part 3151 projects radially inwardly.

Figure 25:
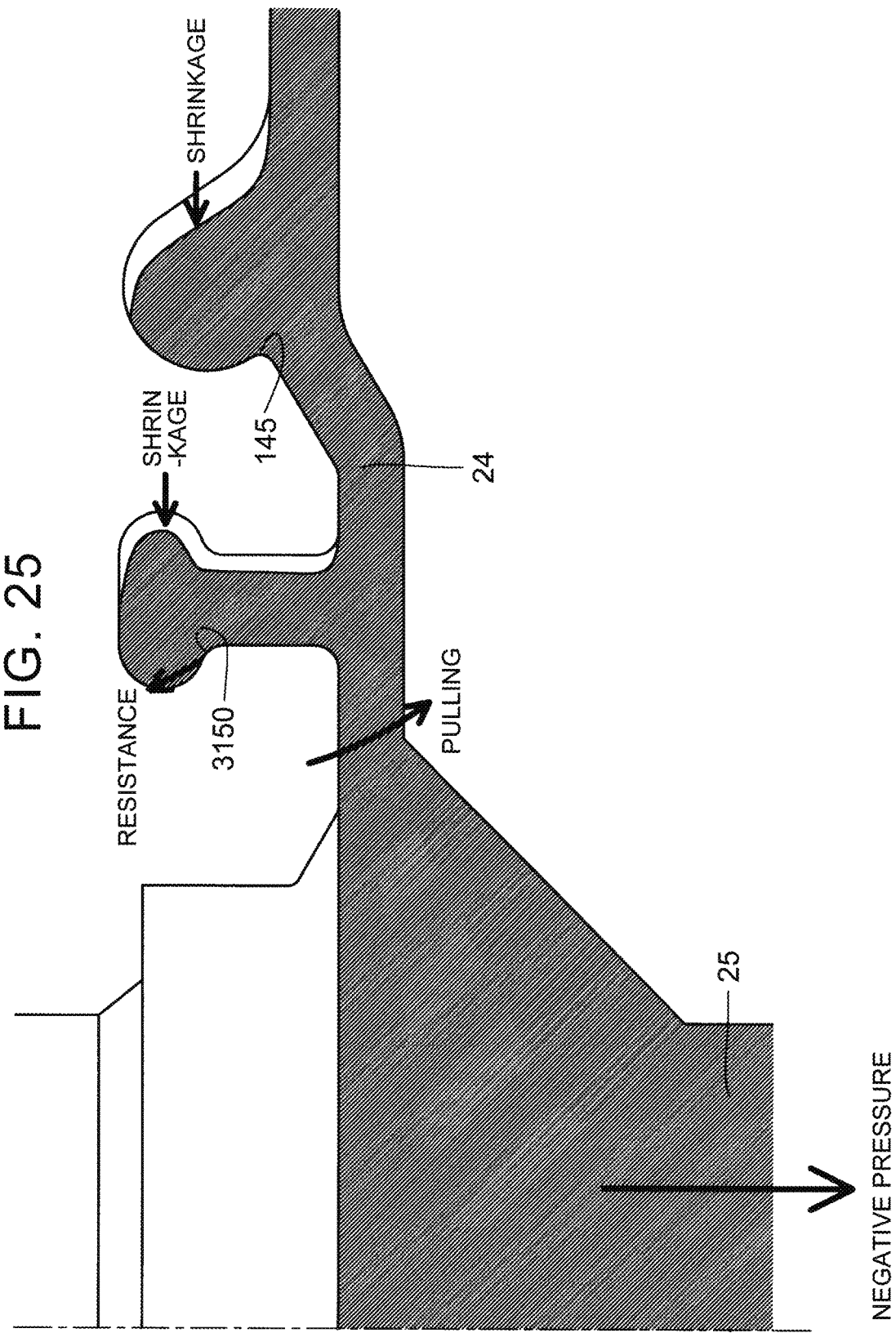
FIG. 25 is a sectional view illustrating a state of insert molding (the modification B).

FIG. 25 is a sectional view illustrating a state where shrinkage occurs radially inwardly as a state of insert molding in the modification B. Even in this case, a resistance to a pulling force is generated at the time when the mold is taken off. The resistance is generated at least at the hooking corner part 3150. The reason why the resistance is generated at the hooking corner part 3150 is because the hooking corner part 3150 projects radially outwardly. In a case where the shrinkage occurs radially inwardly, a resistance to the pulling force is also generated at the corner part 145, similarly to the modification A.

Embodiments of the present disclosure are not limited to the embodiments, examples, and modifications in the present specification, and are achievable in various configurations. For example, technical features of the embodiments, the examples, and the modifications, corresponding to technical features of respective aspects described in the SUMMARY section can be replaced or combined appropriately, e.g., in order to resolve some or all of the problems described above or in order to achieve some or all of the above effects. The technical features may be deleted as appropriate. For example, the following points are exemplified.

The gas to be stored in the internal space of the high pressure tank may not be hydrogen, but any fluid. The liner may not be made of resin. For example, the liner may be made of metal. As an arrangement on the inclined surface 143, the radially inner end of the liner may be placed on the conical surface part 143b, or may be placed on a curved surface of the inner-surface connecting part 143a. The angle of the corner part may be larger than 90 degrees.

In the manufacture of the high pressure tank, the airtight test and the filling into the annular groove 147 by the creep deformation of the opening-side divided liner 21 may be performed separately. For example, the filling into the annular groove 147 by the creep deformation of the opening-side divided liner 21 may be performed before the joining between the divided liners, or may be performed after the joining between the divided liners but before the formation of the reinforcing layer 30.

In the finished high pressure tank 10, a gap may exist between the liner 20 (the opening-side divided liner 21) and the mouth piece 100 (the opening-side flange 120) as illustrated in FIG. 7. In a case where the gap exists, an opposed part of the liner 20 to the annular groove 147 may be recessed as illustrated in FIG. 8, or may not be recessed. Note that it may be possible to easily determine whether shrinkage occurs or not based on whether the gap exists or not.

In a case where the filling into the annular groove 147 is performed before or after the joining between the divided liners as described above, radial deformation of the opening-side divided liner 21 may be restrained by a technique except for the formation of the reinforcing layer 30. The technique except for the formation of the reinforcing layer 30 may be such that the opening-side divided liner 21 is surrounded by a metal mold, for example. In a case where the filling into the annular groove 147 is performed before the joining between the divided liners, since the opening-side divided liner 21 is opened on a side opposite to the mouth piece 100, a metal plate, for example, may be welded to an open end of the opening-side divided liner 21 so as to seal the open end. Liquid may be used for the filling of the annular groove 147.

The bonding on the inclined surface 143 may not be performed. By not performing this bonding, even if the gas enters between the inclined surface 143 and the opening-side divided liner 21, the gas rarely leaks outside due to the sealing at the corner part 145. Further, even if the gas enters between the inclined surface 143 and the opening-side divided liner 21, the opening-side divided liner 21 is not pulled off from the mouth piece 100 due to the structure of the corner part 145 and the annular groove 147. In addition, when a pressure in the tank interior decreases, the gas that enters between the inclined surface 143 and the opening-side divided liner 21 immediately returns to the tank interior because the inclined surface 143 is inclined toward the opening-113 side. On this account, the opening-side divided liner 21 is not largely separated from the inclined surface 143.

The manufacturing method of the high pressure tank may be such a manufacturing method in which, after a liner is placed in a recessed part provided in a bottom-face flange of a mouth piece and a FRP layer is placed around the liner so that the liner is reinforced, a temperature of the liner is increased to a predetermined temperature so as to pressurize the liner from an inside of a high pressure tank. Since the temperature of the liner is increased at the time of pressurization, the liner moves toward the recessed part, thereby making it possible to fill a gap of the recessed part.

The fluid to be used for the inspection using the test piece 500 may not be gas, but may be liquid. The test piece 500 may be generally reduced in diameter. With such a configuration, a small jig 600 can be used, so that the inspection can be easily performed. In order to reduce the diameter of the test piece 500, a metallic member 100a may be manufactured with an exclusive design in S410. Further, if the metallic member 100a is manufactured with an exclusive design, it may not be necessary to provide the through-hole 111 in the metallic member 100a, so S460 can be omitted.

The hole 510 may not be provided in the metallic member 100a. In this case, the leaked gas may be guided outside by other routes. For example, a hole may be formed in the resin member 21a. The hole may be formed in the resin member 21a to be placed on an outer side relative to a sealing surface of the O-ring 820. Alternatively, all the O-rings may not be provided, and an amount of gas that leaks from the jig 600 may be measured. For this measurement, the whole jig 600 is housed in a housing and the housing may be sealed up.

The hooking groove 2147 in the modification A may not be formed in an annular shape. That is, the hooking groove 2147 may be provided intermittently in a circumferential direction thereof. For example, if about four hooking grooves 2147 each having an angle of about 10 degrees around the axis O are provided in the circumferential direction, it is considered that the aforementioned effect by the resistance can be obtained. Also, the hooking groove 3147 in the modification B may not be formed in an annular shape for the same reason.

What is claimed is:

1. A high pressure tank comprising:
  a liner having an internal space in which to seal a fluid; and
  a mouth piece including a cylindrical portion having an opening, and a flange connected to the cylindrical portion and projecting in a radial direction of the cylindrical portion, the mouth piece being attached to the liner, wherein
  an outer peripheral surface of the flange includes a top face and a bottom face with a radially outer end of the outer peripheral surface as a boundary between the top face and the bottom face;
  the bottom face includes an inner surface part at least partially exposed to the internal space, an annular groove hollowed toward an opening side, a connecting surface connecting the inner surface part to the annular groove and having an inclined surface, and a corner part placed between the inclined surface and the annular groove;
  the inclined surface is inclined toward the opening side from a radially inner end of the inclined surface to a radially outer end of the inclined surface;
  the annular groove includes an outer surface placed on a radially outer side relative to a deepest part of the annular groove in an axis direction of the cylindrical portion; and
  a contact pressure between the corner part and the liner is higher than a contact pressure between the outer surface and the liner.

2. The high pressure tank according to claim 1, wherein a ten point height of irregularities of the corner part is 6.3 micrometers (μm) or less.

3. The high pressure tank according to claim 1, wherein the liner is bonded to at least part of the inclined surface.

4. The high pressure tank according to claim 1, further comprising:
  a sealing member configured to seal a radially inner end of the liner.

5. The high pressure tank according to claim 4, wherein the radially inner end of the liner is placed on a radially outer side relative to a predetermined distance toward a radially inner side from a connecting position between the inner surface part and the inclined surface such that the contact pressure at the corner part is maintained.

6. The high pressure tank according to claim 5, wherein the radially inner end of the liner is placed on the inclined surface.

7. The high pressure tank according to claim 1, wherein:
  the bottom face includes a hooking groove hollowed toward the opening side and placed on a radially inner side relative to the annular groove;
  the hooking groove includes a hooking corner part on a radially outer surface, the hooking corner part projecting radially inwardly; and
  the liner makes contact with the hooking corner part.

8. The high pressure tank according to claim 1, wherein an angle of the corner part on a cut surface including the axis is 90 degrees or less.

9. The high pressure tank according to claim 1, wherein the annular groove is filled with the liner.

10. The high pressure tank according to claim 1, wherein a gap exists between the liner and the annular groove.

11. The high pressure tank according to claim 1, wherein a part of the liner is recessed toward the opening side on a plane exposed to the internal space, the part corresponding to the annular groove in the axis direction.

12. A method for manufacturing the high pressure tank according to claim 1, the method comprising:
  attaching the liner made of resin to the mouth piece; and
  filling a gap formed between the liner and the annular groove when the liner made of resin is attached to the mouth piece, such that a temperature and a pressure of a fluid making contact with an inner peripheral surface of the liner are maintained to respective predetermined values or more, and the liner flows to fill the gap.

13. The method for manufacturing the high pressure tank, according to claim 12, further comprising:
  forming a reinforcing layer covering the liner before the temperature and the pressure of the fluid making contact with the inner peripheral surface of the liner are maintained to the respective predetermined values or more.

14. A method for manufacturing the high pressure tank according to claim 1, the method comprising:
  attaching the liner to the mouth piece by insert molding, wherein:
  when the liner is attached to the mouth piece, a radially outer side of the liner relative to the corner part is cooled off earlier than a radially inner side of the liner relative to the corner part, so that the liner is pressed against the corner part.

* * * * *